(12) United States Patent
Izawa et al.

(10) Patent No.: US 8,374,059 B2
(45) Date of Patent: Feb. 12, 2013

(54) HEAT-ASSISTED MAGNETIC WRITE HEAD, HEAD GIMBALS ASSEMBLY, HEAD ARM ASSEMBLY, AND MAGNETIC DISK DEVICE

(75) Inventors: Takahiko Izawa, Tokyo (JP); Tsutomu Chuo, Tokyo (JP); Eiji Komura, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/045,992

(22) Filed: Mar. 11, 2011

(65) Prior Publication Data
US 2012/0230168 A1   Sep. 13, 2012

(51) Int. Cl.
*G11B 11/00* (2006.01)
(52) U.S. Cl. ..................................... 369/13.01
(58) Field of Classification Search .................. None
See application file for complete search history.

(56) References Cited

U.S. PATENT DOCUMENTS

| | | | |
|---|---|---|---|
| 2007/0139818 A1 | 6/2007 | Shimazawa et al. | |
| 2008/0204916 A1* | 8/2008 | Matsumoto et al. | 360/59 |
| 2009/0168220 A1 | 7/2009 | Komura et al. | |
| 2009/0225464 A1* | 9/2009 | Juang et al. | 360/59 |
| 2010/0290323 A1* | 11/2010 | Isogai et al. | 369/13.24 |
| 2011/0170381 A1* | 7/2011 | Matsumoto | 369/13.33 |
| 2011/0216634 A1* | 9/2011 | Chou et al. | 369/13.24 |
| 2011/0228418 A1* | 9/2011 | Sasaki et al. | 360/59 |
| 2011/0286128 A1* | 11/2011 | Tsutsumi et al. | 360/59 |
| 2011/0317528 A1* | 12/2011 | Miyauchi et al. | 369/13.24 |
| 2012/0075965 A1* | 3/2012 | Tanaka et al. | 369/13.33 |
| 2012/0084969 A1* | 4/2012 | Tanaka et al. | 29/603.01 |

FOREIGN PATENT DOCUMENTS

| | | |
|---|---|---|
| JP | A-2008-159159 | 7/2008 |
| JP | A-2009-70554 | 4/2009 |
| JP | A-2009-163806 | 7/2009 |
| JP | A-2009-181611 | 8/2009 |

\* cited by examiner

*Primary Examiner* — Adam R Geisy
*Assistant Examiner* — Henok Heyi
(74) *Attorney, Agent, or Firm* — Oliff & Berridge, PLC

(57) ABSTRACT

A heat-assisted magnetic write head includes a magnetic pole having an end surface exposed at an air bearing surface, a waveguide extending toward the air bearing surface to propagate light, a first pair of clads made of a first dielectric material having a refractive index lower than that of the waveguide, and sandwiching the waveguide in a track width direction, and a second pair of clads made of a second dielectric material having a refractive index lower than that of the first dielectric material, and sandwiching the waveguide in a thickness direction orthogonal to the track width direction. Further, the heat-assisted magnetic write head may include, between the magnetic pole and the waveguide, a plasmon generator generating near-field light from the air bearing surface, based on light propagating through the waveguide.

8 Claims, 19 Drawing Sheets

HEAT-ASSISTED MAGNETIC WRITE HEAD, HEAD GIMBALS ASSEMBLY, HEAD ARM ASSEMBLY, AND MAGNETIC DISK DEVICE

BACKGROUND OF THE INVENTION

1. Field of the Invention

The present invention relates to a heat-assisted magnetic write head used in a heat-assisted magnetic recording in which near-field light is irradiated to lower a coercivity of a magnetic recording medium so as to record information, and a head gimbals assembly, a head arm assembly, and a magnetic disk device which are mounted with the heat-assisted magnetic write head.

2. Description of Related Art

A magnetic disk device in the related art is used for writing and reading magnetic information (hereinafter, simply referred to as information). The magnetic disk device is provided with, for example, in the housing thereof, a magnetic disk in which information is stored, and a magnetic read write head which records information into the magnetic disk and reproduces information stored in the magnetic disk. The magnetic disk is supported by a rotary shaft of a spindle motor, which is fixed to the housing, and rotates around the rotary shaft. On the other hand, the magnetic read write head is formed on a side surface of a magnetic head slider provided on one end portion of a suspension, and the magnetic read write head includes a magnetic recording element and a magnetic reproducing element which have an air bearing surface (ABS) facing the magnetic disk. In particular, as the magnetic reproducing element, a magneto-resistive (MR) element exhibiting magneto-resistive effect is generally used. The other end portion of the suspension is attached to an edge of an arm which is rotatably supported by a fixed shaft installed upright in the housing.

When the magnetic disk device is not operated, namely, when the magnetic disk does not rotate, the magnetic read write head is not located over the magnetic disk and is pulled off to the position away from the magnetic disk (unload state). When the magnetic disk device is driven and the magnetic disk starts to rotate, the magnetic read write head is changed to a state where the magnetic read write head is located at a predetermined position over the magnetic disk together with the suspension (load state). When the rotation number of the magnetic disk reaches a predetermined number, the magnetic head slider is stabilized in a state of slightly floating over the surface of the magnetic disk due to the balance of positive pressure and negative pressure. Thus, the information is accurately recorded and reproduced.

In recent years, with a progress in higher recording density (higher capacity) of the magnetic disk, an improvement in performance of the magnetic read write head and the magnetic disk has been demanded. The magnetic disk is a discontinuous medium including collected magnetic microparticles, and each magnetic microparicle has a single-domain structure. In the magnetic disk, one recording bit is configured of a plurality of magnetic microparticles. Since the asperity of a boundary between adjacent recording bits is necessary to be small in order to increase the recording density, the magnetic microparticles need to be made small. However, if the magnetic microparticles are small in size, thermal stability of the magnetization of the magnetic micorparticles is lowered with decreasing the volume of the magnetic maicroparticles. To solve the difficulty, it is effective to increase anisotropic energy of the magnetic microparticles. However, increasing the anisotropic energy of the magnetic microparticles leads to increase in the coercivity of the magnetic disk. As a result, difficulty occurs in the information recording using the existing magnetic head.

As a method to solve the above-described difficulty, a so-called heat-assisted magnetic recording has been proposed. In the method, a magnetic recording medium with large coercivity is used. When recording information, heat is applied together with the magnetic field to a portion where the information is recorded out of the magnetic recording medium to increase the temperature and to lower the coercivity, thereby recording the information. Hereinafter, the magnetic head used for the heat-assisted magnetic recording is referred to as a heat-assisted magnetic write head.

In the heat-assisted magnetic recording, near-field light is generally used for applying heat to the magnetic recording medium. As a method of generating near-field light, a method using a near-field light probe that is a metal strip generating near-field light from a plasmon which is excited by light, that is, so-called plasmon generator is generally known. However, it is known that the plasmon generator which generates near-field light by direct irradiation of light converts the irradiated light into near-field light with extremely low efficiency. A large part of energy of light irradiated to the plasmon generator is reflected by the surface of the plasmon generator or converted into heat energy to be absorbed to the plasmon generator. Therefore, in the plasmon generator, increase of temperature involved with the absorption of heat energy becomes extremely large.

In the heat-assisted magnetic recording, from the viewpoint of the efficiency and the precision, on the surface facing the medium, the generation position of the recording magnetic field and the generation position of the near-field light are desirably approached as much as possible. For example, U.S. Patent Application Publication No. 2007/139818 specification discloses a magnetic head in which a near-field light generation section that generates near-field light in response to irradiation of laser light and an end portion of a main magnetic-pole layer are arranged to be laid over with a dielectric layer in between or directly with each other on a surface facing the medium. In addition, U.S. Patent Application Publication No. 2009/168220 specification discloses a magnetic head in which at least a part of a magnetic pole is arranged between first and second near-field light generation sections that respectively generate near-field light in response to irradiation of laser light. However, if a main magnetic pole generating recording magnetic field is arranged near a plasmon generator generating near-field light, the main magnetic pole is heated with increasing the temperature of the plasmon generator. As a result, depending on the humidity condition of the atmosphere, there is a possibility that the main magnetic pole is corroded by moisture in the air.

Consequently, it is desirable to provide a heat-assisted magnetic write head capable of improving recording density while preventing corrosion due to increase of the temperature of the main magnetic pole.

SUMMARY OF THE INVENTION

A heat-assisted magnetic write head according to an embodiment of the invention includes a magnetic pole having an end surface exposed at an air bearing surface, a waveguide extending toward the air bearing surface to propagate light, a first pair of clads made of a first dielectric material with a refractive index lower than that of the waveguide, and sandwiching the waveguide in a track width direction, and a second pair of clads made of a second dielectric material with a refractive index lower than that of the first dielectric material, and sandwiching the waveguide in a thickness direction intersecting with the track width direction.

A head gimbals assembly, a head arm assembly, and a magnetic disk device according to an embodiment of the invention include the above-described heat-assisted magnetic write head.

In the heat-assisted magnetic write head, the head gimbals assembly, the head arm assembly, and the magnetic disk device which are mounted with the heat-assisted magnetic write head according to an embodiment of the invention, the second pair of clads with a refractive index lower than that of the first pair of clads which sandwiches the waveguide in the track width direction, sandwiches the waveguide in the thickness direction. Therefore, for example, energy density of light propagating through the waveguide is increased in the track width direction. As a result, the write track width is allowed to be narrowed at the time of performing magnetic information recording to the magnetic disk, and therefore improvement of the recording density is achievable.

In the heat-assisted magnetic write head according to an embodiment of the invention, the waveguide may have a shape in which the maximum dimension in the track width direction is larger than the maximum dimension in the thickness direction because the energy density of light propagating through the waveguide is further increased in the track width direction.

In the heat-assisted magnetic write head according to an embodiment of the invention, light propagating through the waveguide may have maximum energy density at a position close to the magnetic pole rather than a center position of the waveguide. This is because when magnetic information is recorded on a magnetic disk, a position of a heating spot on the magnetic disk is closer to a generation position of recording magnetic field, and thus heat-assisted magnetic recording is advantageously performed with high efficiency and high precision.

DETAILED DESCRIPTION OF THE PREFERRED EMBODIMENTS

Hereinafter, a preferred embodiment of the invention will be described in detail with reference to drawings.

[Configuration of Magnetic Disk Device]

First, referring to FIG. 1 and FIG. 2, a configuration of a magnetic disk device will be described below as an embodiment of the invention.

Figure 1:
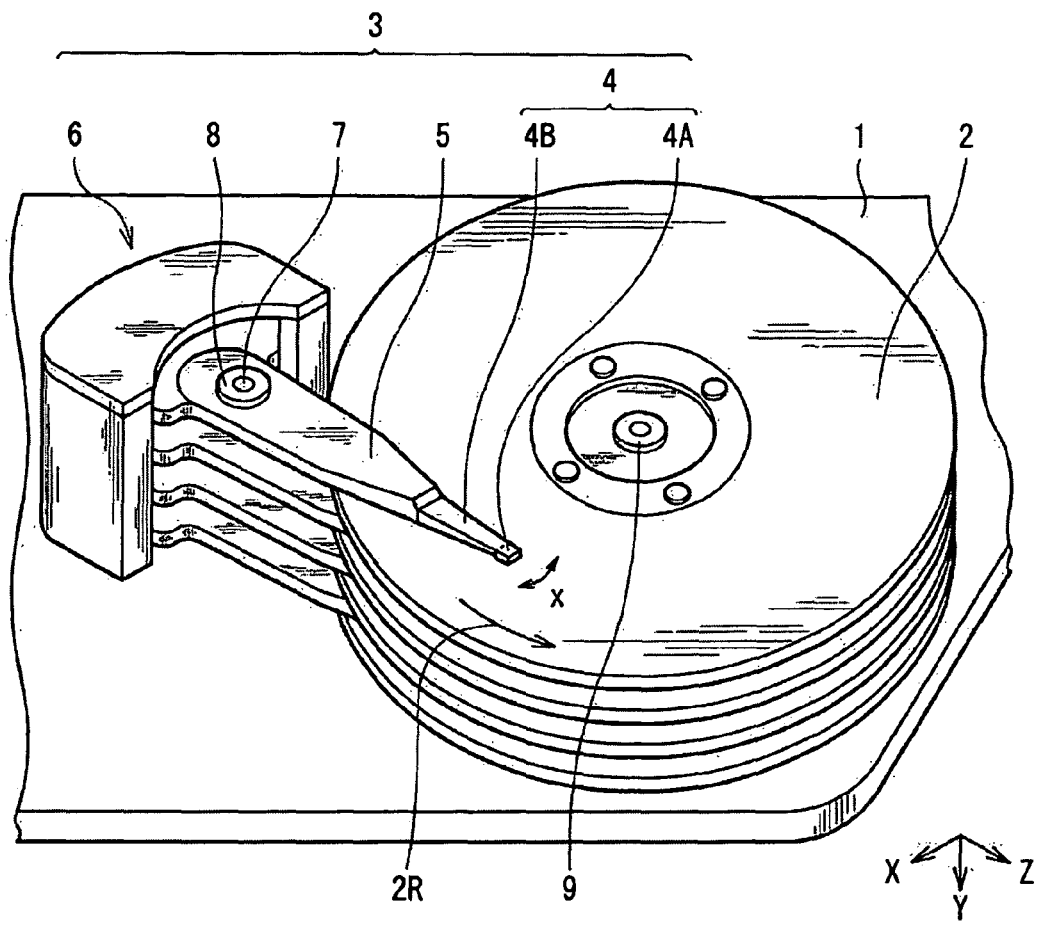
FIG. 1 is a perspective view illustrating a configuration of a magnetic disk device provided with a magnetic read write head according to an embodiment of the invention.

FIG. 1 is a perspective view illustrating an internal configuration of the magnetic disk device as the embodiment. The magnetic disk device adopts load/unload system as a driving system, and includes, inside of the housing 1, a magnetic disk 2 as a magnetic recording medium in which information is to be recorded, and a head arm assembly (HAA) 3 for writing information in the magnetic disk 2 and reading the information. The HAA 3 is provided with a head gimbals assembly (HGA) 4, an arm 5 supporting a base of the HGA 4, and a driving section 6 as a power source for rotating the arm 5. The HGA 4 includes a magnetic head slider (hereinafter, simply referred to as a slider) 4A having a side surface provided with a magnetic read write head (described later) according to the embodiment, and a suspension 4B having an end portion provided with the slider 4A. The arm 5 supports the other end portion of the suspension 4B (an end portion opposite to the end portion provided with the slider 4A). The arm 5 is configured so as to be rotatable around a fixed shaft 7 fixed to the housing 1 through a bearing 8. The driving section 6 is configured of, for example, a voice coil motor. The magnetic disk device has a plurality (four in FIG. 1) of magnetic disks 2, and the slider 4A is disposed corresponding to recording surfaces (a front surface and a rear surface) of each of the magnetic disks 2. Each slider 4A is capable of moving in a direction across write tracks, that is, in a width direction of a track (in X-axis direction) in a plane parallel to the recording surface of each magnetic disk 2. On the other hand, the magnetic disk 2 is configured to rotate around a spindle motor 9 fixed to the housing 1 in the rotation direction 2R substantially orthogonal to the X-axis direction. With the rotation of the magnetic disk 2 and the movement of the slider 4A, information is written into the magnetic disk 2 or stored information is read out. Further, the magnetic disk device has a control circuit (described later) which controls a write operation and a read operation of a magnetic read write head 10, and controls an emission operation of a laser diode as a light source which generates laser light used for heat-assisted magnetic recording which will be described later.

Figure 2:
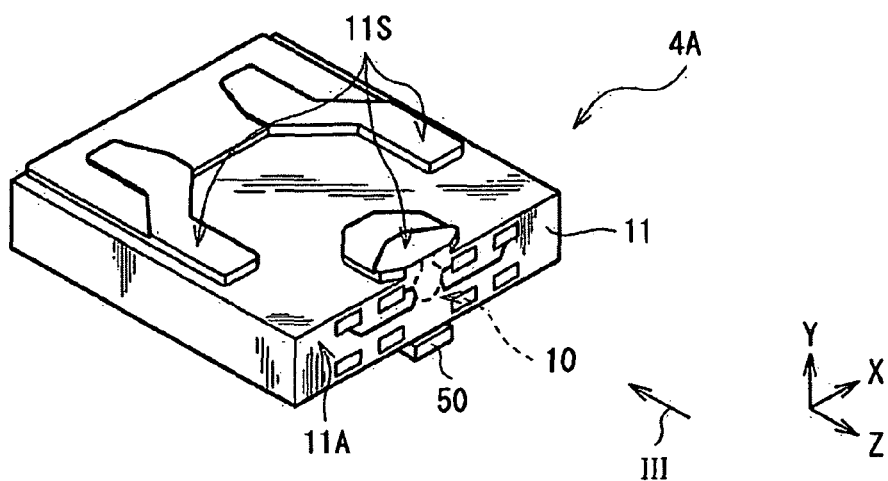
FIG. 2 is a perspective view illustrating a configuration of a slider in the magnetic disk device illustrated in FIG. 1.

FIG. 2 illustrates a configuration of the slider 4A illustrated in FIG. 1. The slider 4A has, for example, a block-shaped substrate 11 made of $Al_2O_3$.TiC (AlTiC). The substrate 11 is substantially formed as a hexahedron, for example, and one surface thereof corresponds to an ABS 11S disposed oppositely and proximally to the recording surface of the magnetic disk 2. When the magnetic disk device is not driven, namely, when the spindle motor 9 is stopped and the magnetic disk 2 does not rotate, the slider 4A is pulled off to the position away from the magnetic disk 2 (unload state), in order to prevent contact of the ABS 11S and the recording surface. In contrast, when the magnetic disk device is initiated, the magnetic disk 2 starts to rotate at a high speed by the spindle motor 9, and the arm 5 is rotated around the fixed shaft 7 by the driving section 6. Therefore, the slider 4A moves above the front surface of the magnetic disk 2, and is in a load state. The rotation of the magnetic disk 2 at a high speed leads to air flow between the recording surface and the ABS 11S, and lift force caused by the air flow leads to a state where the slider 4A floats to maintain a certain distance (magnetic spacing) along a direction (Y-axis direction) orthogonal to the recording surface. On the element forming surface 11A that is one side surface orthogonal to the ABS 11S, the magnetic read write head 10 is provided. Incidentally, on a surface 11B opposite to the ABS 11S of the substrate 11, a light source unit 50 is provided in the vicinity of the magnetic read write head 10.

[Detailed Configuration of Magnetic Read Write Head]

Next, the magnetic read write head 10 will be described in more detail with reference to FIGS. 3 to 5.

Figure 3:
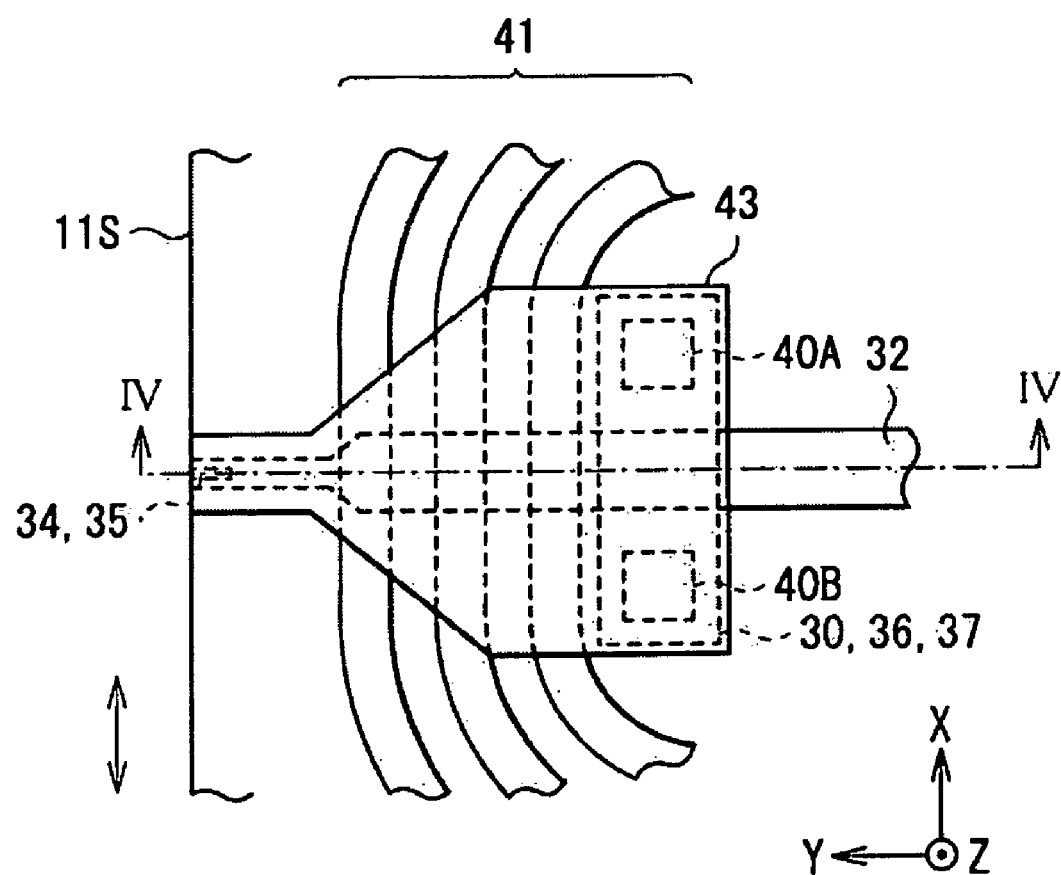
FIG. 3 is a plane view illustrating a configuration of a relevant part of the magnetic read write head, viewed from an arrow III direction illustrated in FIG. 2.
Figure 4:
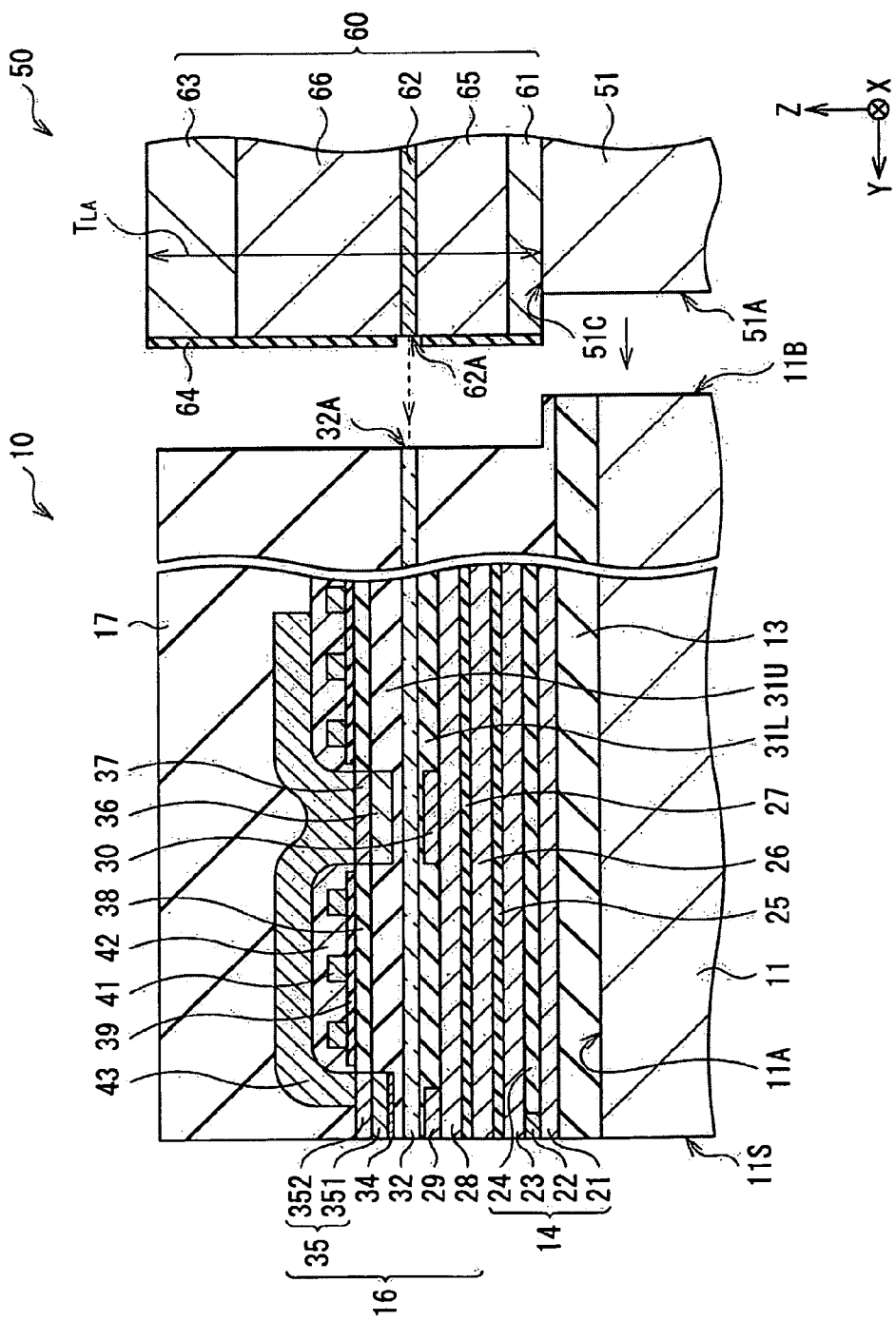
FIG. 4 is a sectional view illustrating a configuration of the magnetic read write head, viewed from an arrow direction along a IV-IV line illustrated in FIG. 3.
Figure 5:
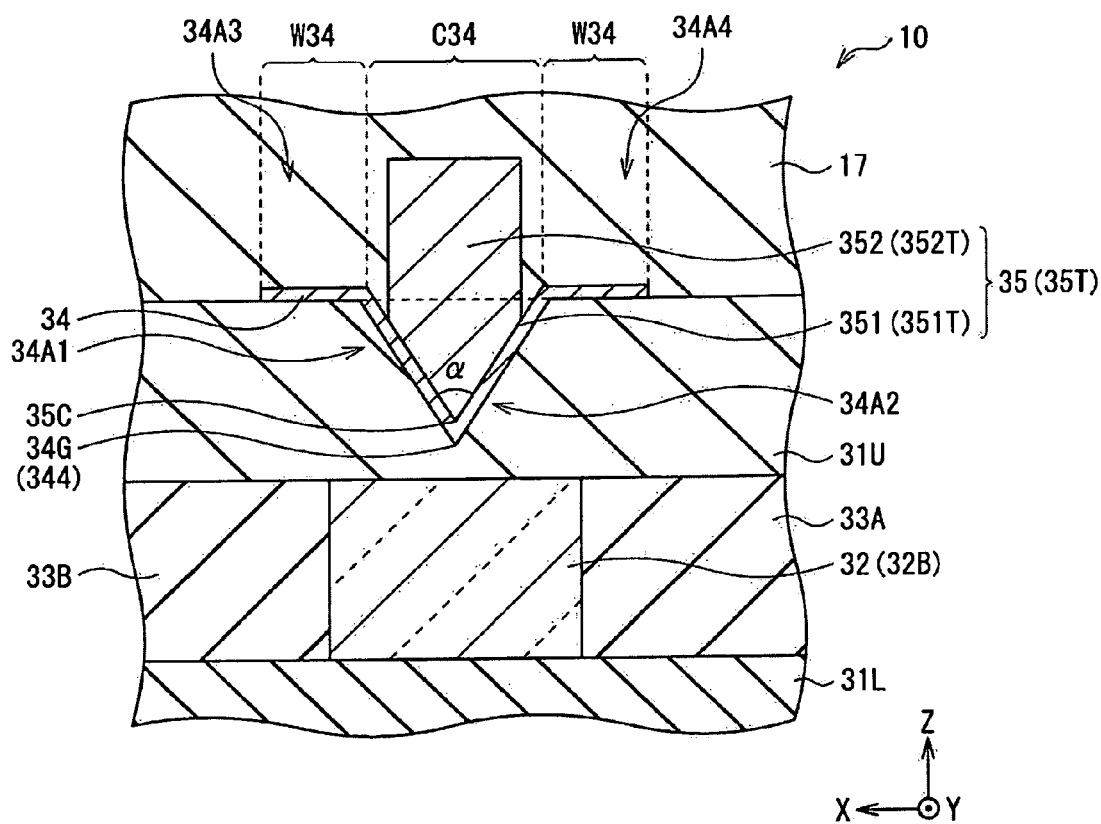
FIG. 5 is a plane view illustrating a configuration of an end surface exposed at an air bearing surface of a main part of the magnetic read write head.

FIG. 3 is a plane view of the magnetic read write head 10 viewed from a direction of an arrow III illustrated in FIG. 2, FIG. 4 is a sectional view illustrating a configuration thereof in an arrow direction along a IV-IV line illustrated in FIG. 3, and FIG. 5 illustrates a part of an end surface exposed at the ABS 11S in enlarged manner. The magnetic read write head 10 has a stacked structure including an insulating layer 13, a read head section 14, a write head section 16, and a clad layer 17 which are stacked in order on the substrate 11. Each of the read head section 14 and the write head section 16 has an end surface exposed at the ABS 11S.

The read head section 14 performs a read process using magneto-resistive effect (MR). The read head section 14 is configured by stacking, for example, a lower shield layer 21, an MR element 22, and an upper shield layer 23 in order on the insulating layer 13.

The lower shield layer 21 and the upper shield layer 23 are respectively formed of a soft magnetic metal material such as NiFe (nickel iron alloy), and are disposed oppositely to sandwich the MR element 22 in the stacking direction (in Z-axis direction). As a result, the lower shield layer 21 and the upper shield layer 23 exhibit a function to protect the MR element 22 from the influence of unnecessary magnetic field.

One end surface of the MR element 22 is exposed at the ABS 11S, and the other end surfaces thereof are in contact with an insulating layer 24 filling a space between the lower shield layer 21 and the upper shield layer 23. The insulating layer 24 is formed of an insulating material such as $Al_2O_3$ (aluminum oxide), AlN (aluminum nitride), $SiO_2$ (silicon dioxide), or DLC (diamond-like carbon).

The MR element 22 functions as a sensor for reading magnetic information recorded on the magnetic disk 2. Note that in the embodiment, in a direction (Y-axis direction) orthogonal to the ABS 11S, a direction toward ABS 11S using the MR element 22 as a base or a position near the ABS 11S is called "front side". A direction toward opposite side to the ABS 11S using the MR element 22 as a base or a position away from the ABS 11S is called "back side". The MR element 22 is a CPP (current perpendicular to plane)-GMR (giant magnetoresistive) element whose sense current flows inside thereof in a stacking direction. The lower shield layer 21 and the upper shield layer 23 each function as an electrode to supply the sense current to the MR element 22.

In the read head section 14 with such a structure, a magnetization direction of a free layer (not illustrated) included in the MR element 22 changes depending on a signal magnetic field from the magnetic disk 2. Thus, the magnetization direction of the free layer shows a change relative to a magnetization direction of a pinned layer (not illustrated) also included in the MR element 22. When the sense current is allowed to flow through the MR element 22, the relative change in the magnetization direction appears as the change of the electric resistance. Therefore, the read head section 14 detects the signal magnetic field with use of the change to read the magnetic information.

On the read head section 14, an insulating layer 25, an intermediate shield layer 26, and an insulating layer 27 are stacked in order. The intermediate shield layer 26 functions to prevent the MR element 22 from being affected by a magnetic field which is generated in the write head section 16, and formed of, for example, a soft magnetic metal material such as NiFe. The insulating layers 25 and 27 are formed of, for example, the similar material to the insulating layer 24.

The write head section 16 is a vertical magnetic write head performing a recording process of heat-assisted magnetic recording system. The write head section 16 has, for example, a lower yoke layer 28, a leading shield 29 and a connecting layer 30, a clad 31L, a waveguide 32, clads 33A and 33B, and a clad 31U in order on the insulating layer 27. The clads 33A and 33B configure a first pair of clads sandwiching the waveguide 32 in a track width direction (X-axis direction). On the other hand, the clads 31L and 31U configure a second pair of clads sandwiching the waveguide 32 in a thickness direction (Z-axis direction). Incidentally, the leading shield 29 may be omitted from the structure.

The lower yoke layer 28, the leading shield 29 and the connecting layer 30 are formed of a soft magnetic metal material such as NiFe. The leading shield 29 is located at the frontmost end portion of the upper surface of the lower yoke layer 28 so that one end surface of the leading shield 29 is exposed at the ABS 11S. The connecting layer 30 is located backward of the leading shield 29 on the upper surface of the lower yoke layer 28. The clad 31L is made of a dielectric material having a refractive index lower than that of the waveguide 32, and is provided to cover the lower yoke layer 28, the leading shield 29, and the connecting layer 30. The waveguide 32 provided on the clad 31L extends in a direction (Y-axis direction) orthogonal to the ABS 11S, one end surface of the waveguide 32 is exposed at the ABS 11S, and the other end surface is exposed at the backward thereof. Note that the front end surface of the waveguide 32 may be located at a receded position from the ABS 11S without being exposed at the ABS 11S. The cross-sectional surface of the waveguide 32 parallel to the ABS 11S is formed rectangular, for example, and the maximum dimension in the track width direction of the waveguide 32 is larger than the maximum dimension in the thickness direction. The waveguide 32 is formed of a dielectric material which allows laser light to pass therethrough. The clads 33A and 33B are configured of a first dielectric material having a refractive index lower than that of the material of the waveguide 32, with respect to the laser light propagating through the waveguide 32. In addition, the clads 31L and 31U are configured of a second dielectric material having a refractive index lower than that of the first dielectric material, with respect to the laser light. In other words, the constituent material of the waveguide 32 exhibits the highest refractive index to the laser light, then, the first dielectric material configuring the clads 33A and 33B exhibits the high refractive index, and the second dielectric material configuring the clads 31L and 31U exhibits the lowest refractive index. Examples of the constituent material of the waveguide 32 include SiC, DLC, TiOx (titanium oxide), TaOx (tantalum oxide), SiNx (silicon nitride), SiOxNy (silicon oxynitride), Si (silicon), zinc selenide (ZnSe), NbOx (niobium oxide), GaP (gallium phosphide), ZnS (zinc sulfide), ZnTe (zinc telluride), CrOx (chromium oxide), FeOx (iron oxide), CuOx (copper oxide), SrTiOx (strontium titanate), BaTiOx (barium titanate), Ge (germanium), and C (diamond). Examples of the first dielectric material configuring the clads 33A and 33B include SiOx (silicon oxide) and $Al_2O_3$ (aluminum oxide). Examples of the second dielectric material configuring the clads 31L and 31U include AlN (aluminum nitride) and $Al_2O_3$.

The write head section 16 further includes a plasmon generator 34 provided above the front end portion of the waveguide 32 through the clad 31U, and a magnetic pole 35 provided to be in contact with the upper surface of the plasmon generator 34. The plasmon generator 34 and the magnetic pole 35 are arranged so that one end surface of each of the plasmon generator 34 and the magnetic pole 35 is exposed at the ABS 11S. The magnetic pole 35 is configured by stacking a first layer 351 and a second layer 352 in order on the plasmon generator 34. Both the first layer 351 and the second layer 352 are configured of a magnetic material with high saturation flux density such as iron-based alloy. Examples of the iron-based alloy include FeCo (iron cobalt alloy), FeNi (iron nickel alloy), and FeCoNi (iron cobalt nickel alloy). The plasmon generator 34 generates near-field light NF (described later) from the ABS 11S, based on the laser light which is propagated through the waveguide 32. The magnetic pole 35 stores therein magnetic flux generated in a coil 41 (described later), releases the magnetic flux from the ABS 11S, thereby generating a recording magnetic field for recording magnetic information into the magnetic disk 2. The plasmon generator 34 and the first layer 351 are embedded in the clad layer 33. The detail of the configuration, functions and the like of the plasmon generator 34 and the magnetic pole 35 will be described later.

The write head section 16 further includes a connecting layer 36 embedded in the clad layer 33 at the backward of the plasmon generator 34 and the magnetic pole 35, and a connecting layer 37 provided to be in contact with the upper surface of the connecting layer 36. Both the connecting layers 36 and 37 are arranged above the connecting layer 30 and are formed of a soft magnetic metal material such as NiFe.

The write head section 16 is provided with two connecting portions 40A and 40B (FIG. 3) which are embedded in the clads 31U, 33A, and 33B. The connecting portions 40A and 40B are also formed of a soft magnetic metal material such as NiFe. The connecting portions 40A and 40B extend in Z-axis direction so as to connect the connecting layer 30 and the connecting layer 36, and are arranged in X-axis direction so as to sandwich the waveguide 32 with a distance.

As illustrated in FIG. 4, on the clad 31U, an insulating layer 38 is provided to fill a space around the second layer 352 of the magnetic pole 35. On the insulating layer 38, an insulating layer 39 and the coil 41 which is formed in spiral around the connecting layer 37, are stacked in order. The coil 41 is intended to generate magnetic flux for recording by flow of a write current, and is formed of a high conductive material such as Cu (copper) and Au (gold). The insulating layers 38 and 39 are configured of an insulating material such as $Al_2O_3$, AlN, $SiO_2$ or DLC. The insulating layers 38 and 39 and the coil 41 are covered with an insulating layer 42, and an upper yoke layer 43 is further provided to cover the insulating layer 42. The insulating layer 42 is configured of, for example, a non-magnetic insulating material flowing on heating, such as a photoresist or a spin on glass (SOG). The insulating layers 38, 39, and 42 are intended to electrically separate the coil 41 from other nearby devices. The upper yoke layer 43 is formed of a soft magnetic material with high saturation flux density such as CoFe, the front portion thereof is connected to the second layer 352 of the magnetic pole 35, and a part of the rear portion is connected to the connecting layer 37. In addition, the front end surface of the upper yoke layer 43 is located at a receded position from the ABS 11S.

In the write head section 16 with such a structure, by the write current flowing through the coil 41, magnetic flux is generated inside a magnetic path which is mainly configured by the leading shield 29, the lower yoke layer 28, the connecting layer 30, the connecting portions 40A and 40B, the connecting layers 36 and 37, the upper yoke layer 43, and the magnetic pole 35. Accordingly, a signal magnetic field is generated near the end surface of the magnetic pole 35 exposed at the ABS 11S, and the signal magnetic field reaches a predetermined region of the recording surface of the magnetic disk 2.

Further, in the magnetic read write head 10, a clad 17 made of, for example, the same material as that of the clad 31U is formed to cover the entire upper surface of the write head section 16.

The light source unit 50 provided at the backward of the magnetic read write head 10 includes a laser diode 60 as a light source for emitting laser light, and a rectangular-solid supporting member 51 supporting the laser diode 60.

The supporting member 51 is formed of, for example, a ceramic material such as $Al_2O_3 \cdot TiC$. As illustrated in FIG. 4, the supporting member 51 is provided with an adhesive surface 51A to be adhered to a rear surface 11B of the substrate 11, and a light source mounting surface 51C provided to be orthogonal to the adhesive surface 51A. The light source mounting surface 51C is parallel to the element forming surface 11A. The laser diode 60 is mounted on the light source mounting surface 51C. The supporting member 51 desirably has a function as a heat sink for dissipating heat generated by the laser diode 60, in addition to a function to support the laser diode 60.

Laser diodes generally used for communication, for optical disc storage, or for material analysis, for example, InP-based, GaAs-based or GaN-based laser diodes, may be used as the laser diode 60. The wavelength of the laser light emitted from the laser diode 60 may be any value within the range of 375 nm to 1.7 μm. Specifically, examples of such a laser diode include a laser diode of InGaAsP/InP quaternary mixed crystal with the emission wavelength region of 1.2 to 1.67 μM. As illustrated in FIG. 4, the laser diode 60 has a multilayer structure including a lower electrode 61, an active layer 62, and an upper electrode 63. An n-type semiconductor layer 65 including n-type AlGaN is inserted between the lower electrode 61 and the active layer 62, and a p-type semiconductor layer 66 including p-type AlGaN is inserted between the active layer 62 and the upper electrode 63. On each of two cleavage surfaces of the multilayer structure, a reflecting layer 64 is provided, which totally reflects light to excite oscillation and is formed of $SiO_2$, $Al_2O_3$, or the like. In the reflecting layer 64, an aperture for emitting laser light is provided at a position including an emission center 62A of the active layer 62. The relative position of the light source unit 50 and the magnetic read write head 10 is fixed by adhering the adhesive surface 51A of the supporting member 51 to the rear surface 11B of the substrate 11 so that the emission center 62A and the rear end surface 32A of the waveguide 32 are coincident with each other. The thickness $T_{LA}$ of the laser diode 60 is, for example, within a range of about 60 to 200 μm. A predetermined voltage is applied between the lower electrode 61 and the upper electrode 63 so that laser light is emitted from the emission center 62A of the active layer 62, and is then incident to the rear end surface 32A of the waveguide 32. The laser light emitted from the laser diode 60 is preferably polarized light of TM mode whose electric field oscillates in a direction perpendicular to the surface of the active layer 62. The laser diode 60 may be driven with use of a power source in the magnetic disk device. The magnetic disk device generally includes a power source generating a voltage of about 2V, for example, and the voltage generated by the power source is sufficient to drive the laser diode 60. In addition, the laser diode 60 consumes power of about several tens mW, which may be sufficiently covered by the power source in the magnetic disk device.

Figure 6:
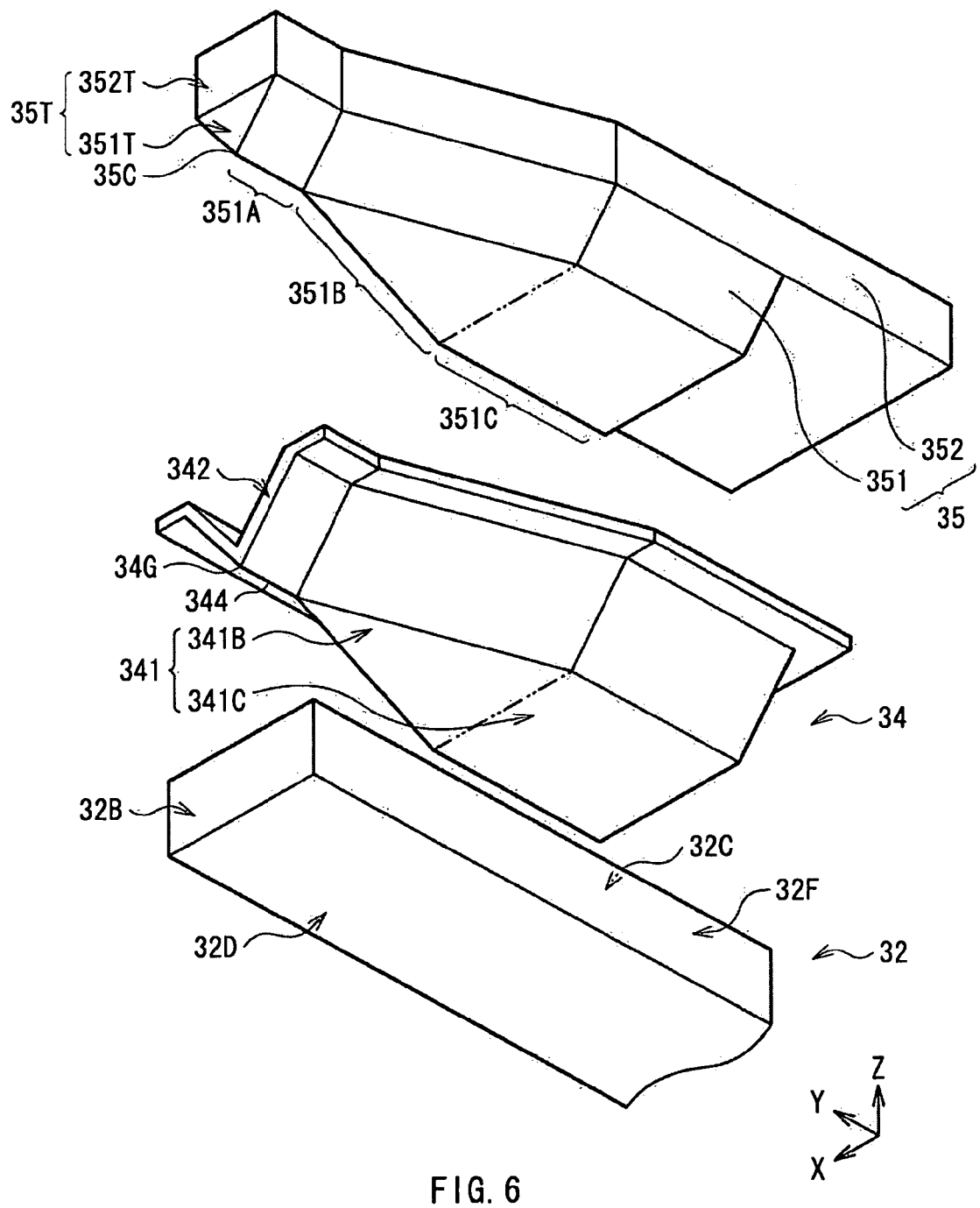
FIG. 6 is an exploded perspective view illustrating a configuration of a main part of the magnetic read write head.
Figure 7:
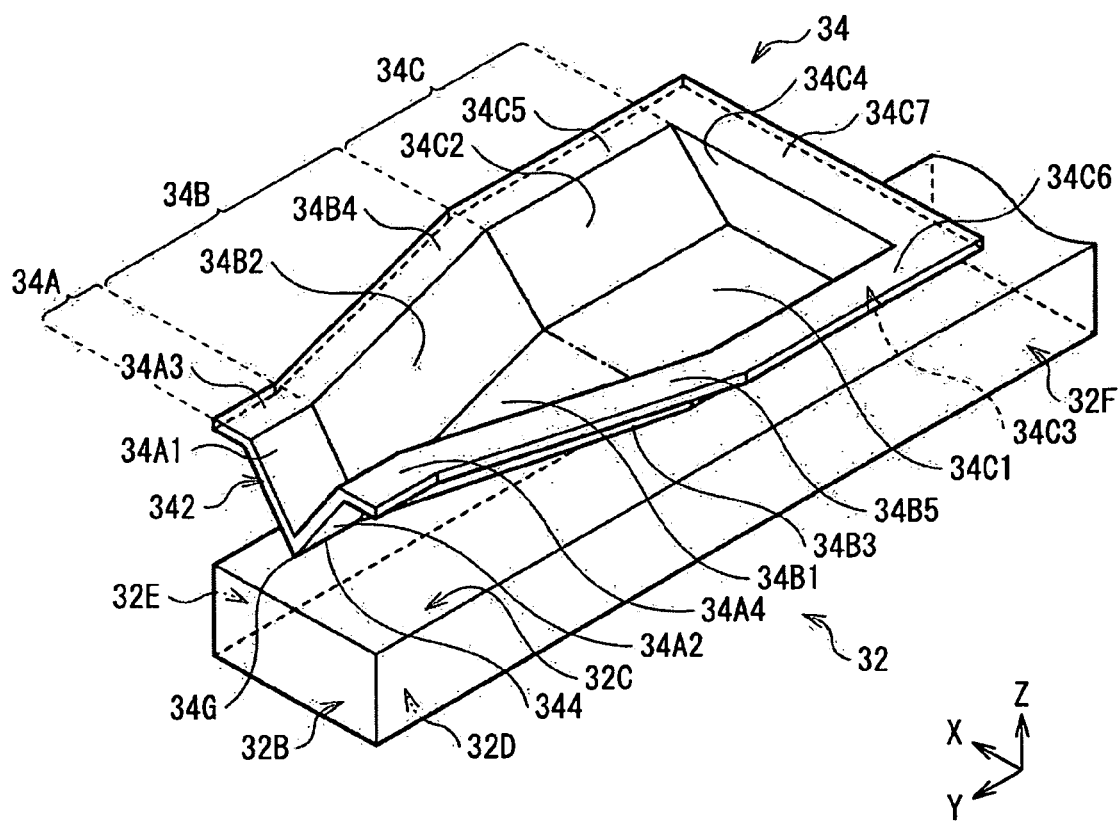
FIG. 7 is another perspective view illustrating the configuration of the main part of the magnetic read write head.
Figure 8:
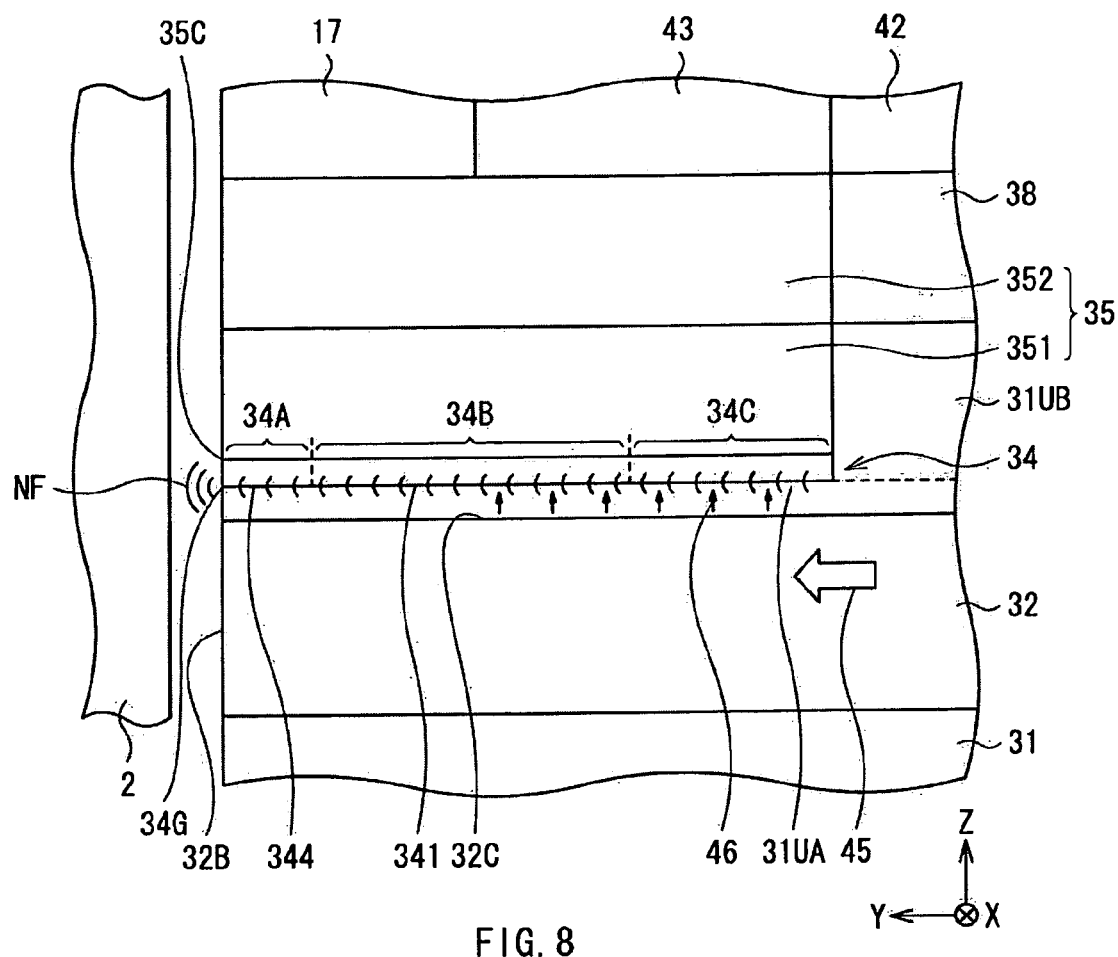
FIG. 8 is a sectional view illustrating a configuration of a cross-sectional surface, which is orthogonal to the air bearing surface, of the main part of the magnetic read write head.
Figure 9:
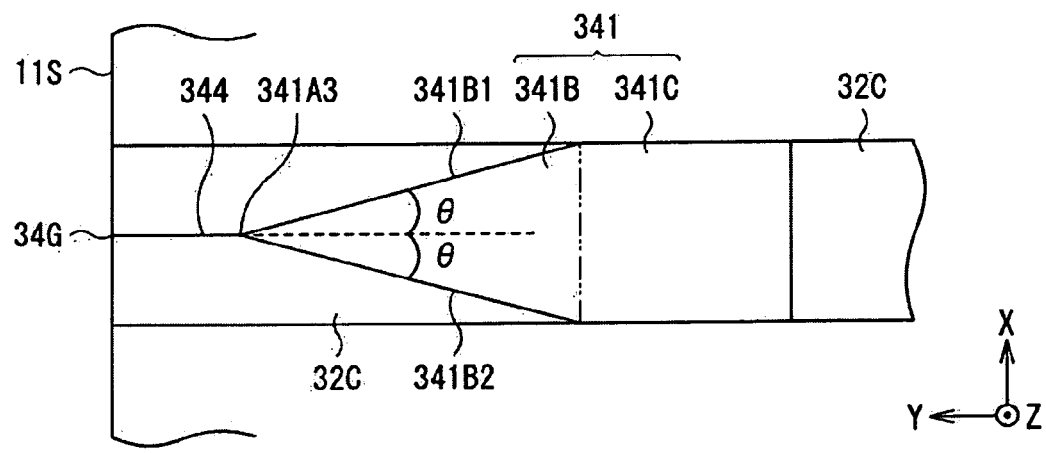
FIG. 9 is a plane view illustrating the main part of the magnetic read write head.

Next, referring to FIGS. 6 to 9 in addition to FIG. 5, the structure and the functions of each of the waveguide 32, the plasmon generator 34, and the magnetic pole 35 will be described in detail. FIG. 6 is an exploded perspective view illustrating the structure of each of the waveguide 32, the plasmon generator 34, and the magnetic pole 35, and FIG. 7 is a perspective view illustrating shapes and positional relationship of the waveguide 32 and the plasmon generator 34. FIG. 8 is a sectional view illustrating the structures and the functions of the waveguide 32, the plasmon generator 34, and the magnetic pole 35, and the section surface is orthogonal to the ABS 11S. FIG. 9 is a plane view illustrating the main part of the plasmon generator 34 viewed from the upper side.

As illustrated in FIG. 7, for example, the waveguide 32 includes an end surface 32B closer to the ABS 11S, an evanescent light generating surface 32C as an upper surface, a lower surface 32D, and two side surfaces 32E and 32F, besides the rear end surface 32A illustrated in FIG. 4. The evanescent light generating surface 32C generates evanescent light, based on the laser light propagating through the waveguide 32. In FIGS. 6 to 9, although the end surface 32B arranged on the ABS 11S is exemplified, the end surface 32B may be arranged at a position spaced from the ABS 11S.

As illustrated in FIG. 7, the plasmon generator 34 has a first portion 34A, a second portion 34B, and a third portion 34C in order from the ABS 11S side. In FIG. 7, the boundary between the second portion 34B and the third portion 34C is indicated by a two-dot chain line. Examples of the constituent material of the plasmon generator 32 include a conductive material including one or more of Pd (palladium), Pt (platinum), Rh (rhodium), Ir (iridium), Ru (ruthenium), Au (gold), Ag (silver), Cu (copper), and Al (aluminum). Here, the constituent materials of the lower layer 34L and the upper layer 34U may be the same kind or different kinds.

As illustrated in FIG. 5, the first portion 34A has a V-shaped center portion C34 including an edge 344 which is projected toward the waveguide on a cross-sectional surface parallel to the ABS 11S, and a pair of wing portions W34 facing to each other with the center portion C34 in between in the track width direction (X-axis direction). The shape of the cross-sectional surface of the first portion 34A parallel to the ABS 11S is not changed regardless of the distance from the ABS 11S.

A V-shaped groove is provided in the center portion C34 of the first portion 34A. In other words, a pair of sidewalls 34A1 and 34A2 which respectively extend in a direction orthogonal to the ABS 11S is connected with each other at the edge 344 so as to form a V-shape including a vertex angle α on a cross-sectional surface parallel to the ABS 11S. To increase the generation efficiency of the near-field light, the vertex angle α is desirably within a range of 55° to 75°. The edge 344 is a boundary portion between the pair of the sidewalls 34A1 and 34A2, and extends in Y-axis direction from a pointed edge 34G exposed at the ABS 11S as a base point to the second portion 34B. The pointed edge 34G is a portion generating the near-field light. The edge 344 faces the evanescent light generating surface 32C of the waveguide 32, and the sidewalls 34A1 and 34A2 are tilted so that the relative distance in X-axis direction becomes wider with increasing distance from the waveguide 32 with the edge 344 being a base point.

In the wing portions W34 of the first portion 34A, a pair of fringes 34A3 and 34A4 is provided so that one end portion of each of the fringes 34A3 and 34A4 in X-axis direction is connected to an end portion on a side opposite to the edge 344 of the sidewalls 34A1 and 34A2, respectively. The pair of the fringes 34A3 and 34A4 extends along a plane (XY-plane) orthogonal to the ABS 11S and parallel to X-axis direction. The sidewalls 34A1 and 34A2 and the fringes 34A3 and 34A4 have a front end surface 342 exposed at the ABS 11S (FIG. 6 and FIG. 7). The first portion 34A has a substantially fixed thickness over the center portion C34 and the pair of the wing portions W34.

As illustrated in FIG. 7, the second portion 34B has a plate-like bottom portion 34B1 facing the evanescent light generating surface 32C, two plate-like sidewalls 34B2 and 34B3, and fringes 34B4 and 34B5. The bottom portion 34B1 is configured so that the width in X-axis direction is zero at the boundary portion with the first portion 34A, and becomes wider with increasing distance from the ABS 11S. The sidewalls 34B2 and 34B3 are provided upright, at both end edge of the bottom portion 34B1 in X-axis direction, toward a side opposite to the waveguide 32. Here, the sidewalls 34B2 and 34B3 are tilted so that the relative distance (a distance in X-axis direction) becomes wider with increasing distance from the waveguide 32 with the portion connected to the bottom portion 34B1 being a base point. In addition, the sidewalls 34B2 and 34B3 are connected to the sidewalls 34A1 and 34A2 of the first portion 34A, respectively. Further, the fringes 34B4 and 34B5 are connected to an end portion opposite to the side of the bottom portion 34B1 of the sidewalls 34B2 and 34B3, respectively, and also connected to the fringes 34A3 and 34A4 of the first portion 34A, respectively. Moreover, in the sidewalls 34B2 and 34B3 and the fringes 34B4 and 34B5, the cross-sectional surfaces orthogonal to the corresponding extending direction preferably have the similar shape to that of the cross-sectional surfaces of the sidewalls 34A1 and 34A2 and the fringes 34A3 and 34A4 of the first portion 34A, respectively.

The third portion 34C includes a bottom portion 34C1, sidewalls 34C2 and 34C3, a wall 34C4, and fringes 34C5, 34C6, and 34C7. The bottom portion 34C1 is provided so as to extend continuously from the bottom portion 34B1 of the second portion 34B in XY-plane. The sidewalls 34C2 and 34C3 are respectively connected to the sidewalls 34B2 and 34B3 of the second portion 34B, and extend to be orthogonal to the ABS 11S. The sidewalls 34C2 and 34C3 are tilted so that the relative distance (the distance in X-axis direction) becomes wider with increasing distance from the waveguide 32, with the connecting portion to the bottom portion 34C1 being a base point. The wall 34C4 couples the bottom portion 34C1 and the rear end portion of each of the sidewalls 34C2 and 34C3. The fringes 34C5 and 34C6 are respectively coupled to the fringes 34B4 and 34B5 of the second portion 34B, and extend to be orthogonal to the ABS 11S. The fringe 34C7 couples the fringes 34C5 and 34C6 and the rear end portion of the wall 34C4. The cross-sectional surface of each of the sidewalls 34C2 and 34C3 and the fringes 34C5 and 34C6, which is orthogonal to the corresponding extending direction, preferably have the similar shape to that of the cross-sectional surface of each of the sidewalls 34A1 and 34A2 and the fringes 34A3 and 34A4 of the first portion 34A, for example. Note that the wall 34C4 and the fringe 34C7 may not be provided.

As illustrated in FIG. 6 and FIG. 7, the first portion 34A, the second portion 34B, and the third portion 34C form a space inside thereof for containing the first layer 351 of the magnetic pole 35.

The surfaces of the bottom portions 34B1 and 34C1 facing the evanescent light generating surface 32C of the waveguide 32 with a predetermined distance are a first surface 341B and a second surface 341C which form a surface plasmon exciting surface 341 as illustrated in FIG. 6. In FIG. 6, the boundary between the first surface 341B and the second surface 341C is indicated by a two-dot chain line.

The magnetic pole 35 has an end surface 35T exposed at the ABS 11S as illustrated in FIG. 5 and FIG. 6. The end surface 35T includes an end surface 351T exposed at the ABS 11S in the first layer 351, and an end surface 352T exposed at the ABS 11S in the second layer 352.

The first layer 351 of the magnetic pole 35 is contained in a space formed by the first portion 34A, the second portion 34B, and the third portion 34C of the plasmon generator 34. Specifically, the first layer 351 has a first portion 351A occupying a space formed by the first portion 34A, a second portion 351B occupying a space formed by the second portion 34B, and a third portion 351C occupying a space formed by the third portion 34C. The first portion 351A has a triangular prism shape closely contacting the sidewalls 34A1 and 34A2 of the first portion 34A of the plasmon generator 34, and the area of the cross-sectional surface of the first portion 351A parallel to the ABS 11S is constant. In X-axis direction, the width of the first portion 351A is desirably smaller than that of the end surface 32B of the waveguide 32. In addition, the width of the first portion 351A is desirably smaller than that of the center portion C34 of the first portion 34A. This is because the maximum intensity of the recording magnetic field from the magnetic pole 35 is increased in both cases. The end surface 351T of the first portion 351A has a pointed edge 35C located at a vertex opposite to the second layer 352.

The second portion 351B is closely contacted with the sidewalls 34B2 and 34B3 and the bottom portion 34B1 of the second portion 34B of the plasmon generator 34. The width of the second portion 351B in X-axis direction becomes wider with increasing the distance, from the ABS 11S, and becomes wider in Z-axis direction with increasing the distance from the waveguide 32. The third portion 351C is closely contacted with the sidewalls 34C2 and 34C3 and the bottom portion 34C1 of the third portion 34C of the plasmon generator 34. The width of the third portion 351C in X-axis direction is constant in Y-axis direction, and becomes wider in Z-axis direction with increasing the distance from the waveguide 32.

As illustrated in FIG. 8, in the clad 31U, a portion disposed between the evanescent light generating surface 32C and the surface plasmon exciting surface 341 is a buffer portion 31UA. In the clad 31U, a portion located backward of the plasmon generator 34 and the first layer 351 is a rear portion 31UB.

FIG. 9 is a plane view illustrating a positional relationship between the surface plasmon exciting surface 341 and the evanescent light generating surface 32C, and illustrates the plasmon generator 34 and the waveguide 32 viewed from the magnetic pole 35 side. However, as for the plasmon generator 34, only a surface facing the evanescent light generating surface 32C is illustrated, and the other surfaces are omitted in illustration. As illustrated in FIG. 9, the width of the first surface 341B in X-axis direction becomes smaller toward the ABS 11S. The first surface 341B has a front end portion 341A3 at a position where end edges 341B1 and 341B2 in X-axis direction intersect with each other. Angles formed by the end edges 341B1 and 341B2 with respect to a direction (Y-axis direction) perpendicular to the ABS 11S are equal to each other. Hereinafter, the angle is represented by θ. The angle θ is within a range of 3 to 50 degrees, for example, and in particular, preferably within a range of 10 to 25 degrees.

[Method of Manufacturing Magnetic Read Write Head]

In addition to FIG. 4, referring to FIGS. 10 to 17, the method of manufacturing the magnetic read write head 10 will be described. FIGS. 10 to 15 are for describing forming processes of a main part of the magnetic read write head 10, and illustrate the cross-sectional configuration of the position to be the ABS 11S eventually. In the following description, first, outline of the entire manufacturing processes will be described with reference to FIG. 4, and then the forming processes of the main part (the clads 33A, 33B, and 31U, the plasmon generator 34, the magnetic pole 35, and the clad 17) will be described in detail with reference to FIGS. 10 to 17. At this time, since the detail of the constituent materials and shapes of the components has already been described, the description thereof is appropriately omitted.

The magnetic read write head 10 is manufactured mainly by sequentially forming and stacking the components by using an existing thin film process. The existing thin film process includes, for example, film forming technique such as electrolytic plating and sputtering, patterning technique such as photolithography, etching technique such as dry etching and wet etching, and polishing technique such as chemical mechanical polishing (CMP).

First, the insulating layer 13 is formed on the substrate 11. Next, the lower shield layer 21, the MR element 22 and the insulating layer 24, and the upper shield layer 23 are stacked and formed in this order on the insulating layer 13 to form the read head section 14. Then, the insulating layer 25, the intermediate shield layer 26, and the insulating layer 27 are stacked in order on the read head section 14.

After that, the lower yoke layer 28, the leading shield 29 and the connecting layer 30, the clad 31L, the waveguide 32, the clads 33A and 33B, the clad 31U, the plasmon generator 34, the magnetic pole 35, and the connecting layers 36 and 37 are formed in order on the insulating layer 27. Note that the leading shield 29 may be omitted from the structure. Further, by performing a planarization treatment after the insulating layer 38 is formed to cover the entire surface, the upper surfaces of the magnetic pole 35, the insulating layer 38, and the connecting layer 37 are planarized. Subsequently, the coil 41 embedded by the insulating layers 39 and 42 is formed.

Moreover, the upper yoke layer 43 connected with the magnetic pole 35 and the connecting layer 37 is formed to complete the write head section 16. After that, the clad layer 17 is formed on the write head section 16, and finally by using CMP or the like, the side surface of the stacked structure from the substrate 11 to the clad layer 17 is totally polished to form the ABS 11S. As a result, the magnetic read write head 10 is completed.

Figure 10:
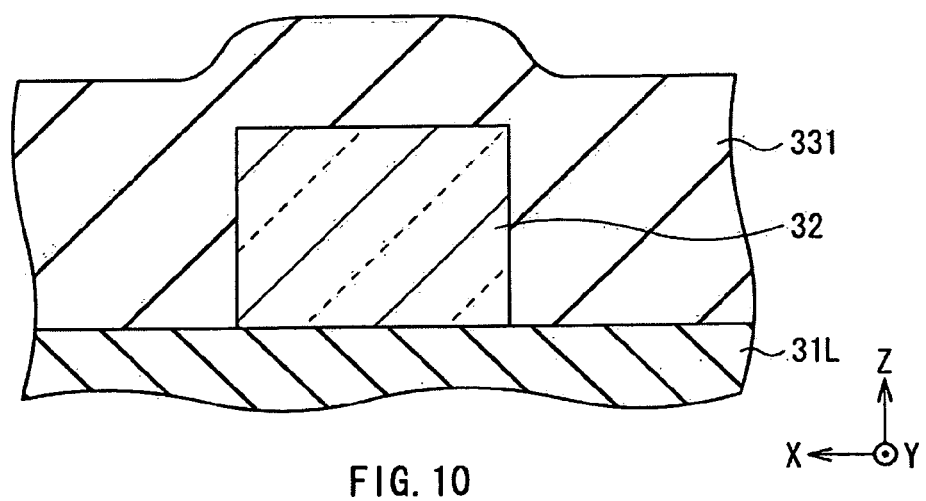
FIG. 10 is a sectional view for describing a manufacturing process of the main part of the magnetic read write head.
Figure 11:
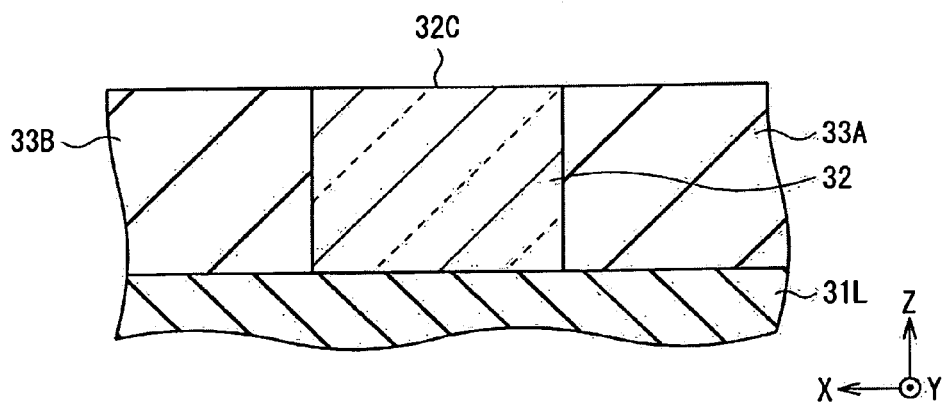
FIG. 11 is a sectional view for describing a process following the process of FIG. 10.

When the main part of the magnetic read write head 10 is formed, as illustrated in FIG. 10, first, a dielectric layer 331 is formed to cover the waveguide 32 provided on the clad 31L. The dielectric layer 331 is formed of the above-described first dielectric material. After that, the dielectric layer 331 is polished by using CMP or the like until the upper surface (that is, the evanescent light generating surface 32C) of the waveguide 32 is exposed, and thus the planar surface is formed. Therefore, as illustrated in FIG. 11, the waveguide 32 and the pair of clads 33A and 33B sandwiching the waveguide 32 in the track width direction are formed on the upper surface of the clad 31L. Alternatively, the dielectric layer 331 is previously formed on the clad 31L, the pair of clads 33A and 33B are formed by providing a through hole which reaches the upper surface of the clad 31L, in the dielectric layer 331, and then the waveguide 32 may be formed so as to fill the through hole.

Figure 12:
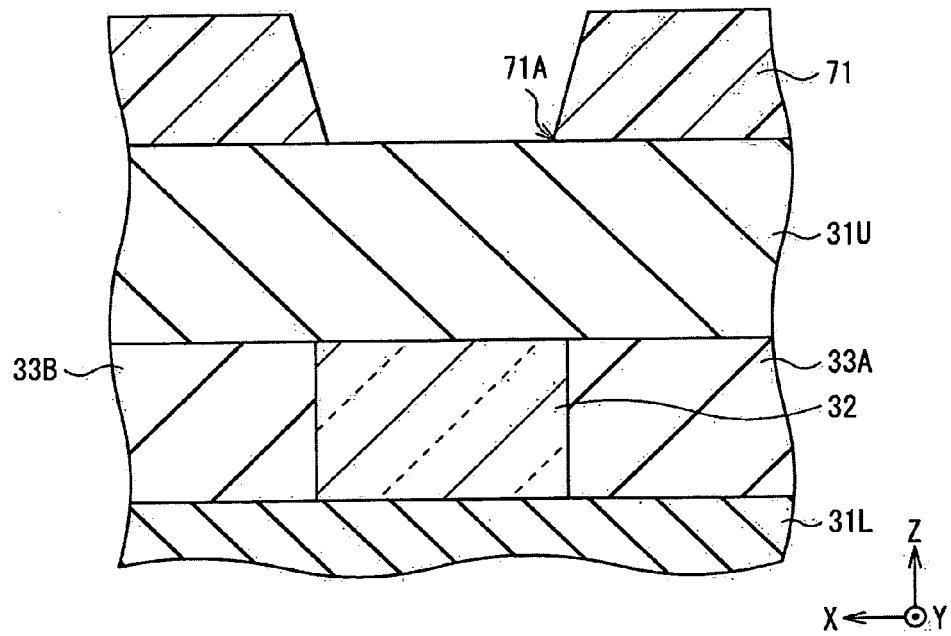
FIG. 12 is a sectional view for describing a process following the process of FIG. 11.

Next, as illustrated in FIG. 12, the clad 31U is formed with use of the second dielectric material so as to cover the planar surface formed by the waveguide 32 and the pair of the clads 33A and 33B. After that, an etching mask 71 made of, for example, a phtoresist is formed on the clad 31U. The etching mask 71 has an aperture 71A with a dimension slightly larger than that of an outer edge of the upper end portion of the plasmon generator 34 to be formed later.

Figure 13:
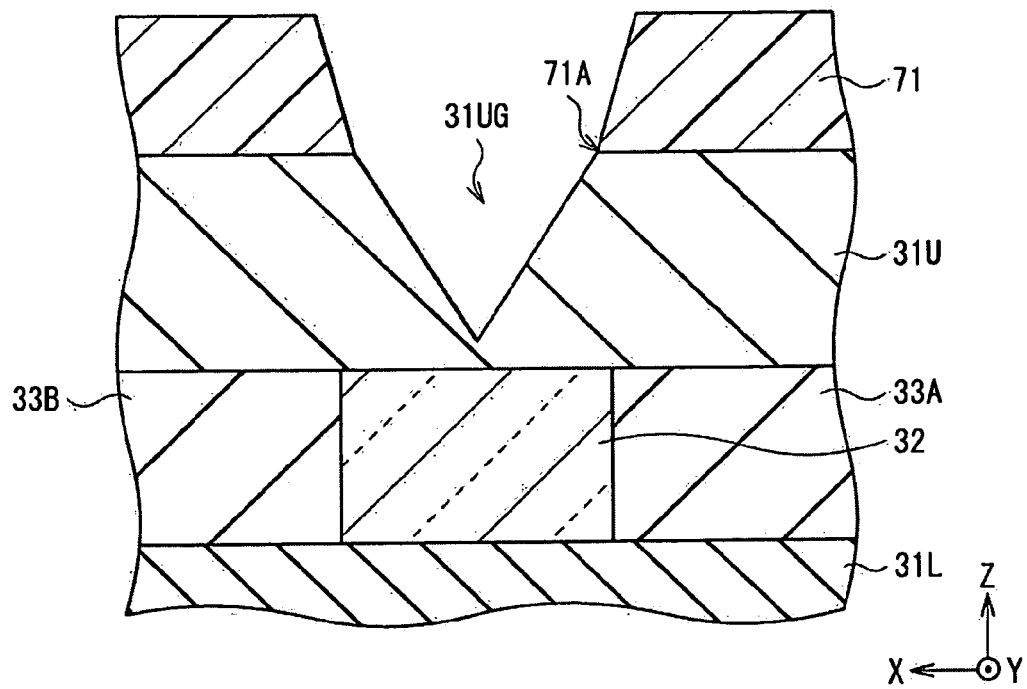
FIG. 13 is a sectional view for describing a process following the process of FIG. 12.

Next, as illustrated in FIG. 13, a V-shaped groove 31UG is formed in the clad 31U by etching a portion (exposed portion) of the clad 31U corresponding to the aperture 71A by using, for example, reactive ion etching. The groove 31UG is formed so that the lower end portion thereof is close to the upper surface of the waveguide 32. The groove 31UG is formed to have a shape slightly larger than the outer shape of the plasmon generator 34 to be formed later.

Figure 14:
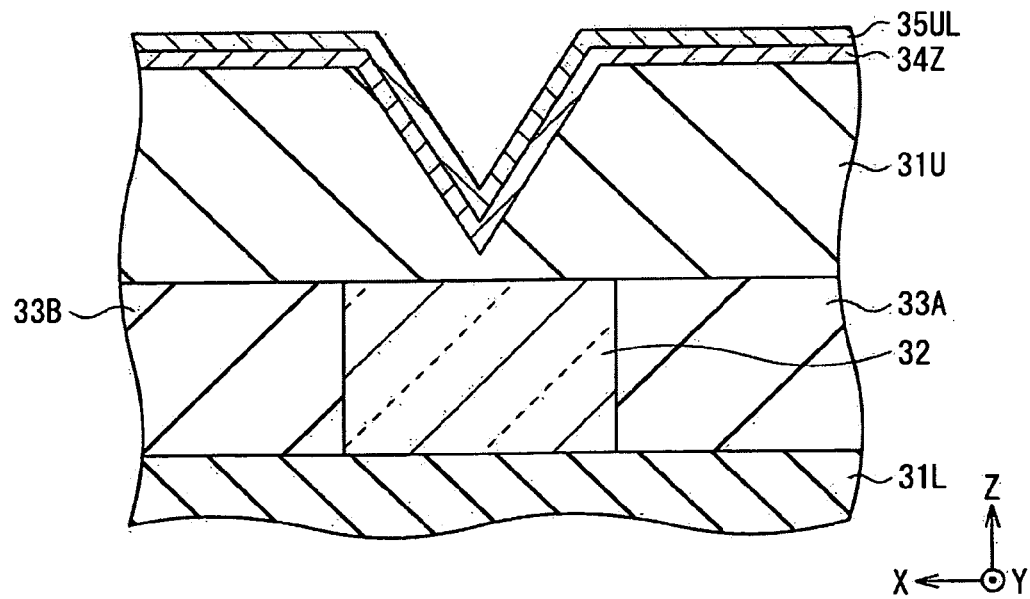
FIG. 14 is a sectional view for describing a process following the process of FIG. 13.

Subsequently, as illustrated in FIG. 14, the etching mask 71 is lifted off, and a metal layer 34Z is then formed to cover the entire surface by, for example, sputtering or ion beam deposition (IBD). The metal layer 34Z is finally to be the plasmon generator 34. Further, a metal layer 35UL is formed to cover the metal layer 34Z by using, for example, sputtering or IBD. The metal layer 35UL is to be a plating base film at the time of forming the magnetic pole 35 later. The metal layer 35UL is formed of a soft magnetic material including any of iron, cobalt, and nickel. The metal layers 34Z and 35UL are formed to cover also an inner surface of the groove 31UG.

Figure 15:
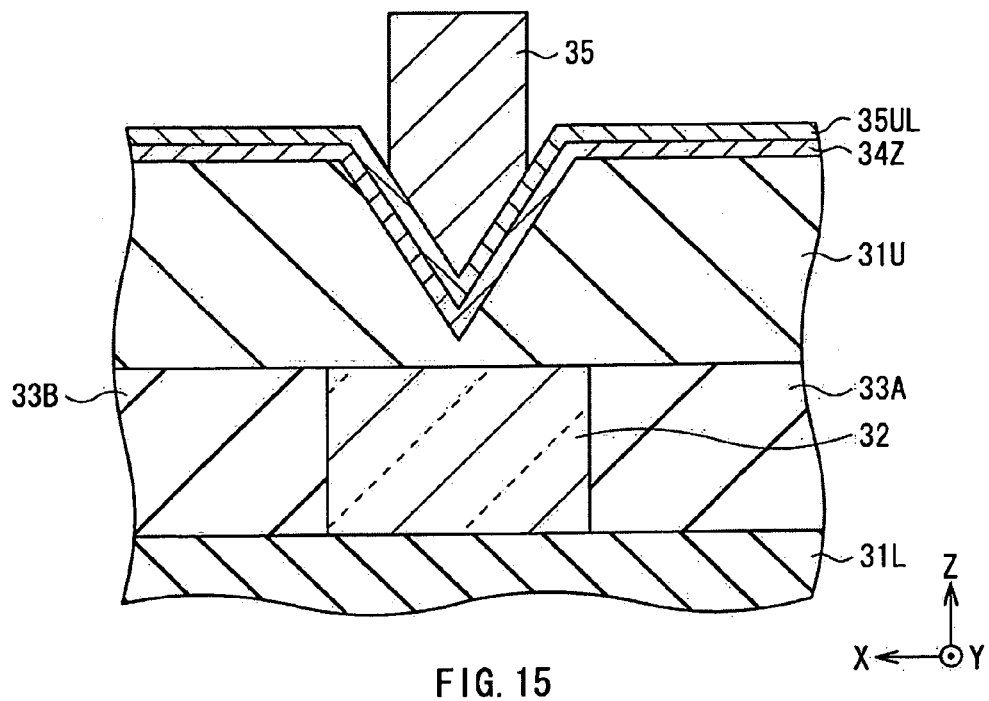
FIG. 15 is a sectional view for describing a process following the process of FIG. 14.

Next, as illustrated in FIG. 15, by plating treatment with use of the metal layer 35UL as a plating base film, the magnetic pole 35 is formed to fill the V-shaped groove in (the first portion 34A of) the plasmon generator 34. The magnetic pole 35 is formed to have a width in X-axis direction narrower than the width of the center portion C34 of the first portion 34A.

Figure 16:
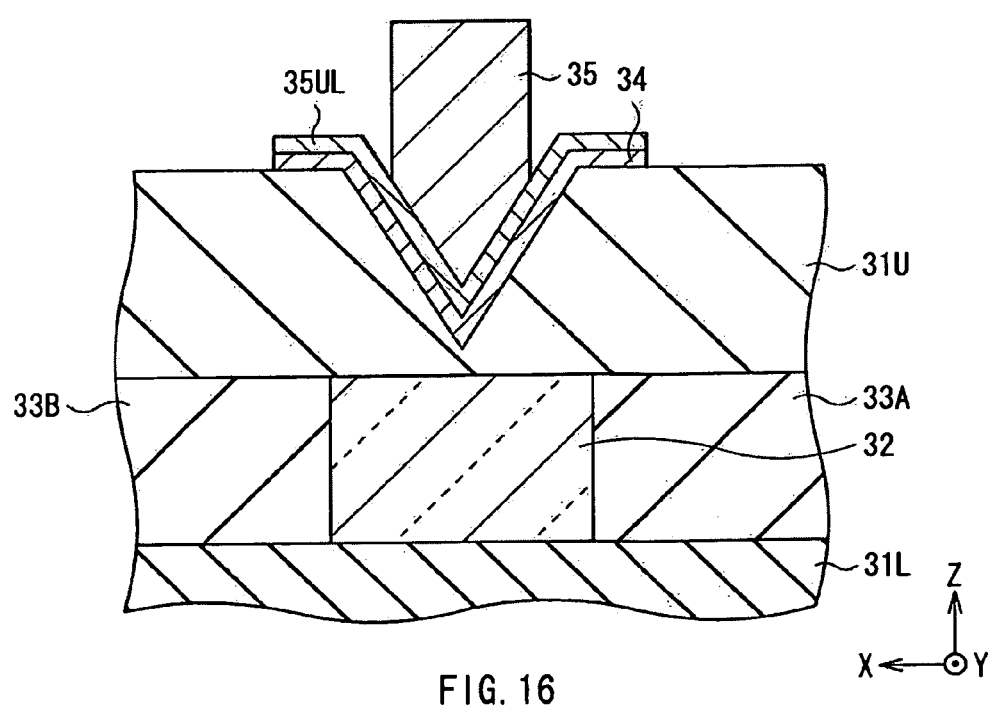
FIG. 16 is a sectional view for describing a process following the process of FIG. 15.

Subsequently, as illustrated in FIG. 16, patterning is performed on the metal layers 34Z and 35UL. As a result, the plasmon generator 34 with a first portion 34A including center portion C34 and the wing portions W34, is formed in a predetermined shape.

Figure 17:
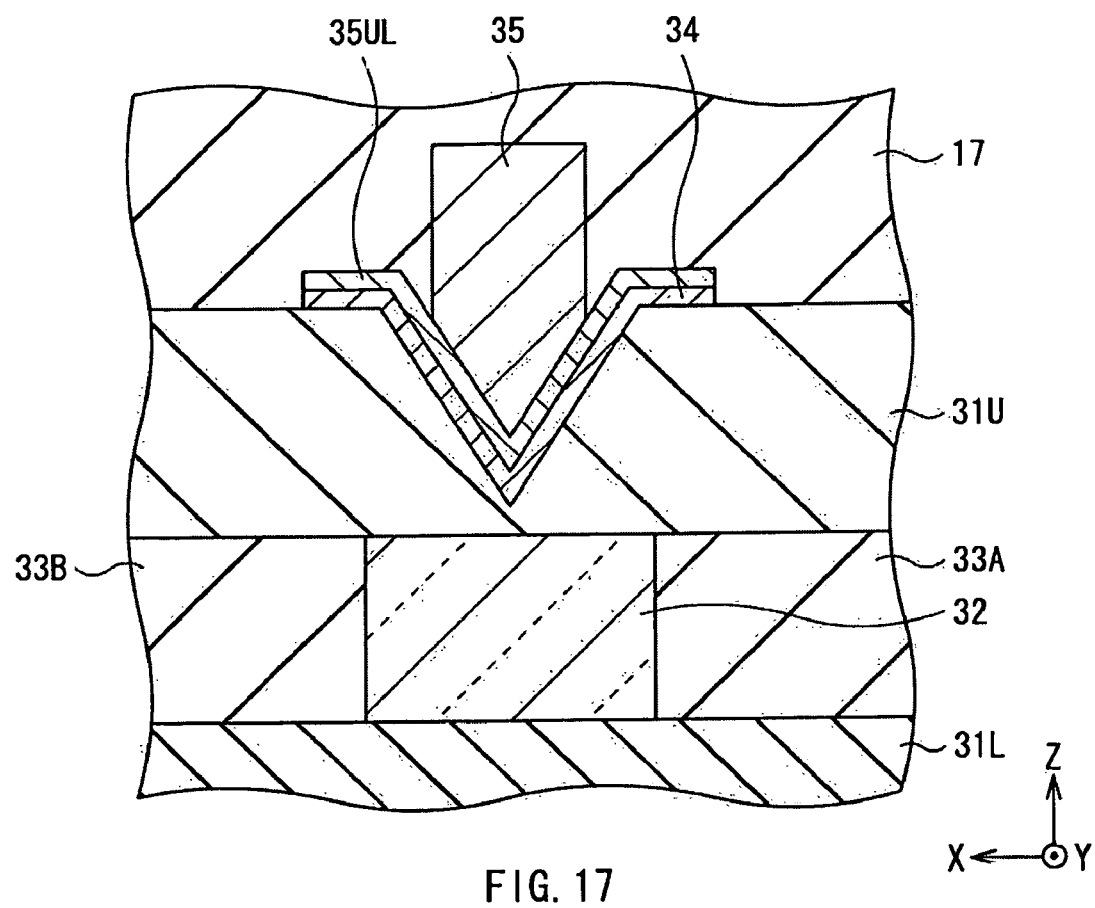
FIG. 17 is a sectional view for describing a process following the process of FIG. 16.

Finally, as illustrated in FIG. 17, for example, by sputtering, the clad 17 is formed. Consequently, the main part of the magnetic read write head 10 is completed.

[Control Circuit of Magnetic Disk Device]

Figure 18:
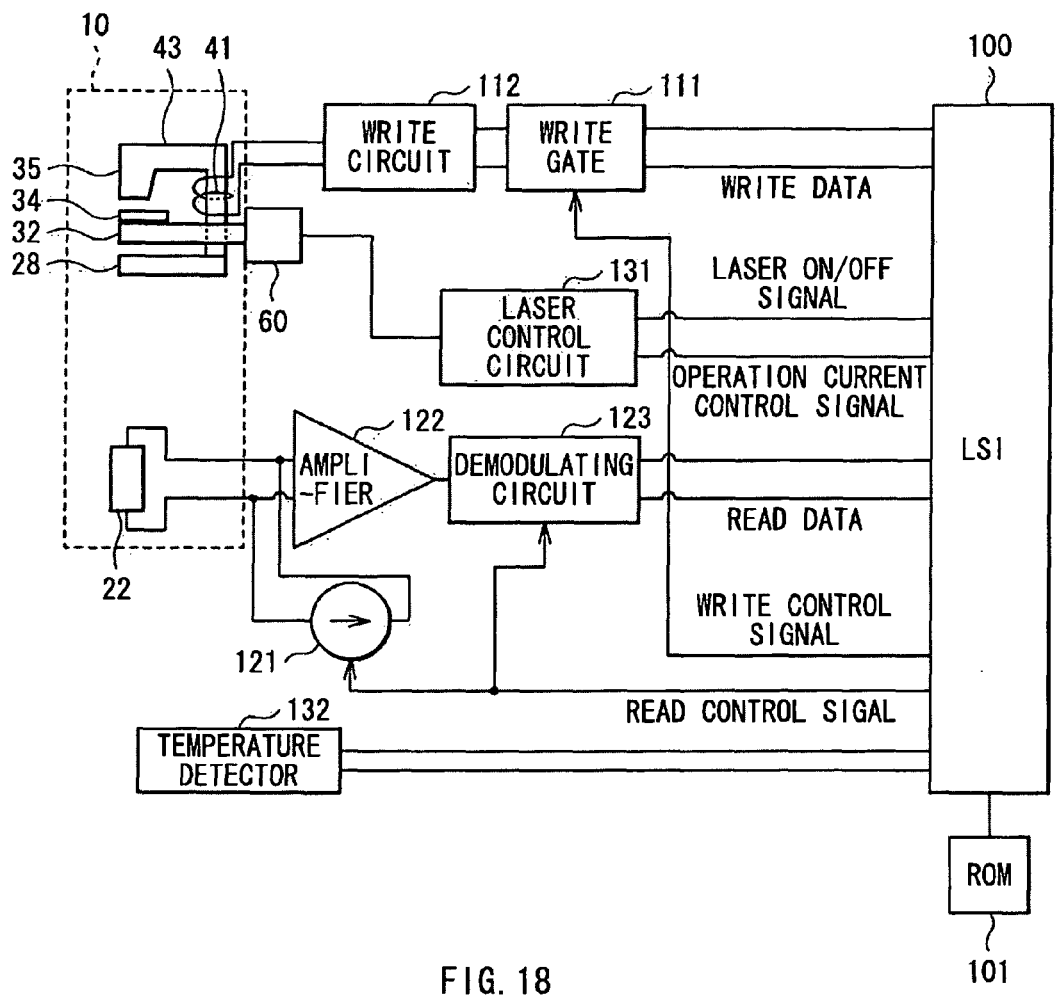
FIG. 18 is a block diagram illustrating a circuit configuration of the magnetic disk device illustrated in FIG. 1.

Referring to FIG. 18, the circuit configuration of the control circuit of the magnetic disk device illustrated in FIG. 1 and the operation of the magnetic read write head 10 are described. The control circuit is provided with a control LSI (large-scale integrated circuit) 100, a ROM (read only memory) 101 connected to the control LSI 100, a write gate 111 connected to the control LSI 100, and a write circuit 112 connecting the write gate 111 and the coil 41. The control circuit is further provided with a constant current circuit 121 connected to the MR element 22 and the control LSI 100, an amplifier 122 connected to the MR element 22, and a demodulating circuit 123 connected to an output end of the amplifier 122 and the control LSI 100. The control circuit is further provided with a laser control circuit 131 connected to the laser diode 60 and the control LSI 100, and a temperature detector 132 connected to the control LSI 100.

The control LSI 100 supplies write data and provides a write control signal to the write gate 111. Also, the control LSI 100 provides the constant current circuit 121 and the demodulating circuit 123 with a read control signal, and receives read data output from the demodulating circuit 123. In addition, the control LSI 100 provides the laser control circuit 131 with a laser ON/OFF signal and an operation current control signal.

The temperature detector 132 detects the temperature of the magnetic recording layer of the magnetic disk 2 to transmit temperature information to the control LSI 100.

The ROM 101 stores a control table and the like to control an operation current value which is supplied to the laser diode 60.

During the write operation, the control LSI 100 supplies the write gate 111 with the write data. The write gate 111 supplies the write data to the write circuit 112 only when the write control signal indicates the write operation. The write circuit 112 allows a write current to flow through the coil 41, based on the write data. As a result, the recording magnetic field is generated by the magnetic pole 35, and data is recorded in the magnetic recording layer of the magnetic disk 2 by this recording magnetic field.

During the read operation, the constant current circuit 121 supplies the MR element 22 with a constant sense current only when the read control signal indicates the read operation. An output voltage of the MR element 22 is amplified by the amplifier 122, and input to the demodulating circuit 123. When the read control signal indicates the read operation, the demodulating circuit 123 demodulates the output of the amplifier 122 to generate read data which is provided to the control LSI 100.

The laser control circuit 131 controls supply of the operation current to the laser diode 60, based on the laser ON/OFF signal, and controls a value of the operation current supplied to the laser diode 60, based on the operation current control signal. When the laser ON/OFF signal indicates ON operation, the operation current equal to or larger than an oscillation threshold value is supplied to the laser diode 60 by control of the laser control circuit 131. Therefore, laser light is emitted from the laser diode 60, and the emitted laser light propagates through the waveguide 32. Then, the near-field light NF (described later) is generated from the pointed edge 34G of the plasmon generator 34 to heat a part of the magnetic recording layer of the magnetic disk 2, and the coercivity of the part is accordingly lowered. At the time of recording, the part of the magnetic recording layer in which the coercivity is lowered is applied with the recording magnetic field generated by the magnetic pole 35. Thus, the recording of the data is performed.

The control LSI 100 determines the value of the operation current of the laser diode 60 with reference to a control table stored in the ROM 101, based on the temperature and the like of the magnetic recording layer of the magnetic disk 2, the temperature being determined by the temperature detector 132, and the control LSI 100 controls the laser control circuit 131 with use of the operation current control signal so that the operation current with the determined value is supplied to the laser diode 60. The control table includes, for example, the oscillation threshold value and data representing temperature dependence of light output-operation current property of the laser diode 60. The control table further may include data representing relationship between the operation current value and the increase amount of the temperature in the magnetic recording layer heated by the near-field light NF, or data representing temperature dependence of the coercivity in the magnetic recording layer.

The control circuit illustrated in FIG. 18 includes a signal system for controlling the laser diode 60, namely, a signal system including the laser ON/OFF signal and the operation current control signal, independent of the control signal system of the write/read operation. Therefore, the control circuit may achieve not only the electric conduction to the laser diode 60 simply linked with the recording operation, but also the electric conduction to the laser diode 60 of various modes. Note that the configuration of the control circuit of the magnetic disk device is not limited to that illustrated in FIG. 18.

Figure 19:
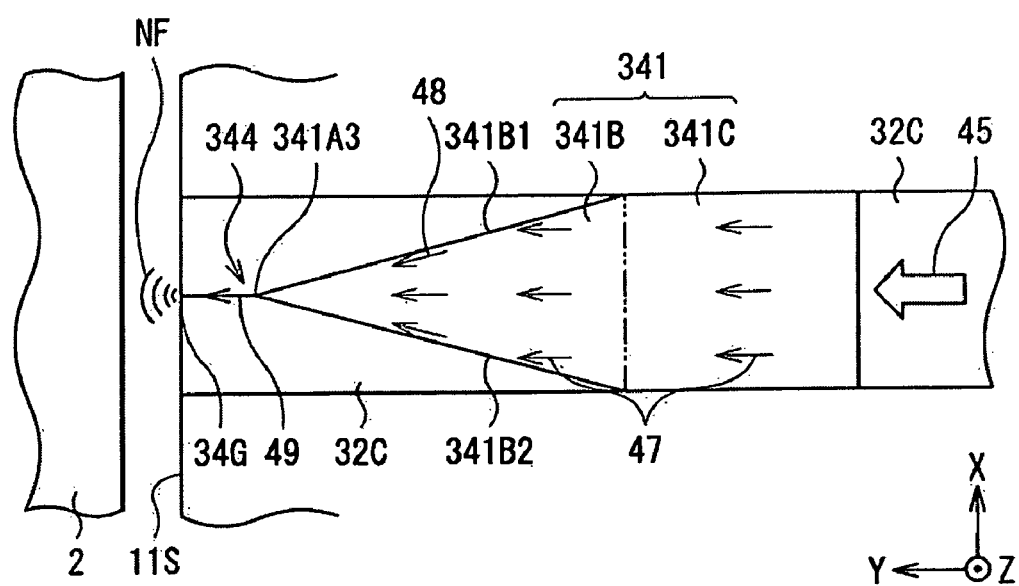
FIG. 19 is an explanatory diagram for describing an operation of the magnetic read write head.

Referring to FIG. 8 and FIG. 19, the principal of the near-field light generation and the principal of the heat-assisted magnetic recording with use of the near-field light according to the embodiment are described. FIG. 19 is, similar to FIG. 9, a plane view illustrating the positional relationship between the surface plasmon exciting surface 341 and the evanescent light generating surface 32C, and illustrates the plasmon generator 34 and the waveguide 32 viewed from the magnetic pole 35 side.

Laser light 45 emitted from the laser diode 60 propagates through the waveguide 32 to reach the vicinity of the plasmon generator 34. The laser light 45 is totally reflected by the evanescent light generating surface 32C that is an interface between the waveguide 32 and a buffer portion 33A, and accordingly, evanescent light 46 (FIG. 8) leaking into the buffer section 33A is generated. After that, a surface plasmon polariton mode is induced by coupling the evanescent light 46 with charge fluctuation on the surface plasmon exciting surface 341 in the outer surface of the plasmon generator 34. As a result, surface plasmons 47 (FIG. 19) are excited on the surface plasmon exciting surface 341. The surface plasmons 47 propagate on the surface plasmon exciting surface 341 toward the pointed edge 34G. The first surface 341B of the surface plasmon exciting surface 341 is configured so that the width thereof in X-axis direction becomes narrower toward the ABS 11S as described above. Accordingly, when propagating on the first surface 341B, the surface plasmons 47 are gradually converted into edge plasmons 48 (FIG. 19) as surface plasmons propagating along the edge rims 341B1 and 341B2, and the electric field intensity of the plasmons including the surface plasmons 47 and the edge plasmons 48 is increased. The surface plasmons 47 and the edge plasmons 48 are converted into edge plasmons 49 (FIG. 19) when reaching the edge 344, and the edge plasmons 49 propagate along the edge 344 toward the ABS 11S. The edge plasmons 49 eventually reach the pointed edge 34G. As a result, the edge plasmons 49 are collected at the pointed edge 34G to generate near-field light NF from the pointed edge 34G, based on the edge plasmons 49. The near-field light NF is irradiated toward the magnetic disk 2 and reaches the surface (recording surface) of the magnetic disk 2 to heat a part of the magnetic recording layer of the magnetic disk 2. As a result, the coercivity at the heated part of the magnetic recording layer is lowered. In the heat-assisted magnetic recording, with respect to the part of the magnetic recording layer with the coercivity thus lowered, data recording is performed by application of the recording magnetic filed generated by the magnetic pole 35.

It is considered that the following first and second principals leads to the increase of the electric field intensity of the plasmons on the first surface 341B. First, the description is made for the first principle. In the embodiment, on the metal surface of the surface plasmon exciting surface 341, the surface plasmons 47 are excited by the evanescent light 46 generated from the evanescent light generating surface 32C. The surface plasmons 47 propagate on the surface plasmon exciting surface 341 toward the pointed edge 34G. The wave number of the surface plasmons 47 propagating on the first surface 341B is gradually increased with decreasing the width of the first surface 341B in X-axis direction, that is, toward the ABS 11S. As the wave number of the surface plasmons 47 is increased, the propagating speed of the surface plasmons 47 becomes slower. As a result, the energy density of the surface plasmons 47 is increased to increase the electric field intensity of the surface plasmons 47.

Next, the description is made for the second principle. When the surface plasmons 47 propagate on the surface plasmon exciting surface 341 toward the pointed edge 34G, a part of the surface plasmons 47 collides with the edge rims 341B1 and 341B2 of the first surface 341B and is scattered, and accordingly a plurality of plasmons with different wave number are generated. A part of the plurality of the plasmons thus generated is converted into the edge plasmons 48 whose wave number is larger than that of the surface plasmons propagating on the plane. In such a way, the surface plasmons 47 are gradually converted into the edge plasmons 48 propagating along the edge rims 341B1 and 341B2, and accordingly, the electric field intensity of the edge plasmons 48 is gradually increased. In addition, the edge plasmons 48 have a larger wave number and slower propagating speed compared with the surface plasmons propagating on the plane. Therefore, the surface plasmons 47 are converted into the edge plasmons 48 to increase the energy density of the plasmons. Further, on the first surface 341B, the surface plasmons 47 are converted into the edge plasmons 48 as described above, and new surface plasmons 47 are also generated based on the evanescent light 46 emitted from the evanescent light generating surface 32C. The new surface plasmons 47 are also converted into the edge plasmons 48. In this way, the electric field intensity of the edge plasmons 48 is increased. The edge plasmons 48 are converted into the edge plasmons 49 propagating through the edge 344. Therefore, the edge plasmons 49 are obtainable which have the increased electric field intensity compared with the surface plasmons 47 at the beginning of generation.

In the embodiment, on the first surface 341B, the surface plasmons 47 propagating on the plane coexist with the edge plasmons 48 whose wave number is larger than that of the surface plasmons 47. It is considered that, on the first surface 341B, the increase of the electric field intensity of both the surface plasmons 47 and the edge plasmons 48 occurs due to the first and second principals described above. Accordingly, in the embodiment, compared with a case where one of the first and second principals is effective, the electric field intensity of the plasmons may be further increased.

[Effects of Magnetic Read Write Head and Magnetic Disk Device]

Figure 20A:
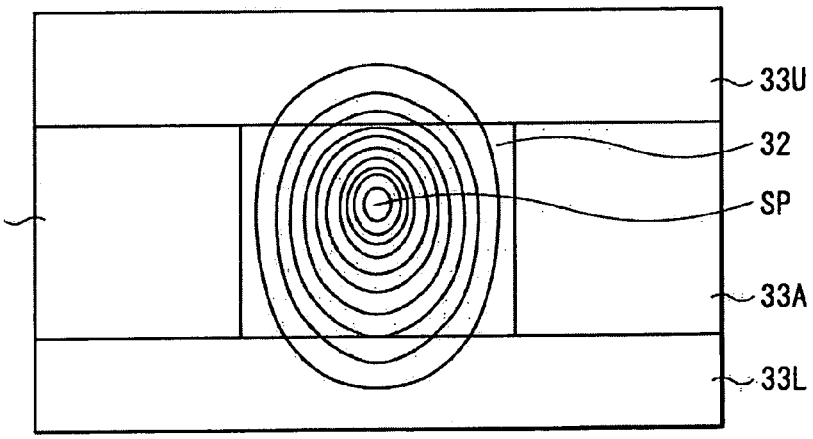
FIGS. 20A and 20B are conceptual diagrams illustrating an energy density distribution of plasmons propagating through a waveguide.
Figure 20B:
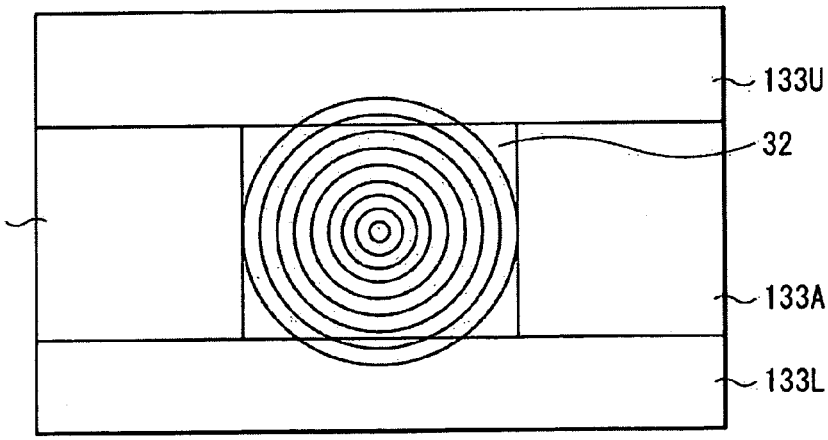
Figure 21:
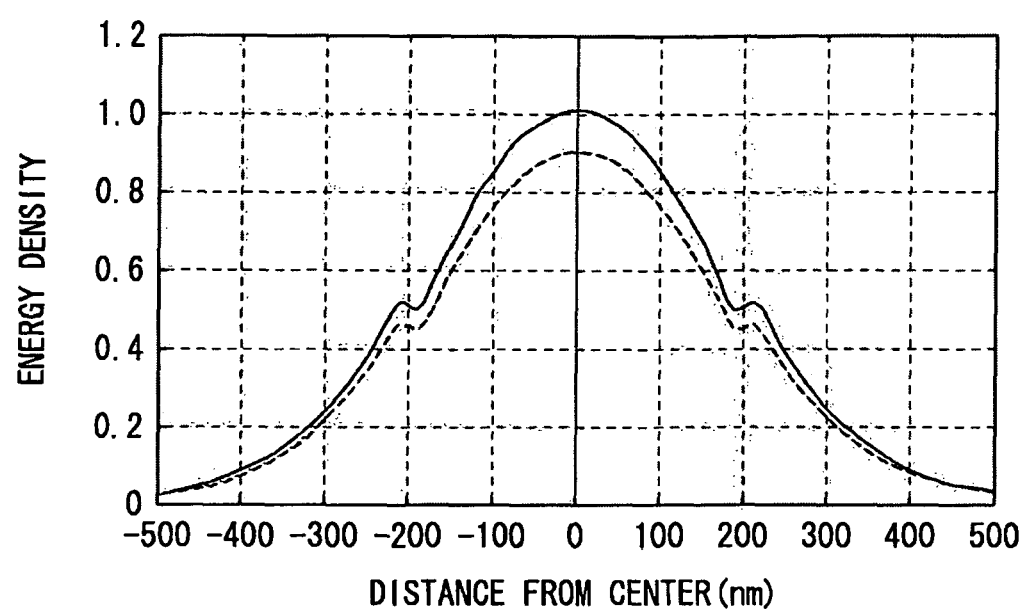
FIG. 21 is a characteristic diagram illustrating an energy density distribution in the track width direction of the plasmons propagating through the waveguide.

In the embodiment, as described above, the pair of clads 31L and 31U, which has the refractive index lower than that of the pair of clads 33A and 33B sandwiching the waveguide 32 in the track width direction, sandwiches the waveguide 32 in the thickness direction. Therefore, for example, as illustrated in FIG. 20A, the energy density of the prasmons propagating through the waveguide 32 is increased in the track width direction. FIG. 20A illustrates an energy density distribution of the laser light 45 propagating through the waveguide 32 in the magnetic read write head 10 of the embodiment. FIG. 20B illustrates an energy density distribution in a case where the waveguide 32 is surrounded by clads 133A, 133B, 133L, and 133U which have the same refractive index. In FIGS. 20A and 20B, a plurality of curves distributed in the waveguide 32 and in the vicinity thereof respectively illustrates regions with the equivalent energy density. Each of the curves illustrating the energy density has the perfect circle shape in FIG. 20B, in contrast, has the irregular oval shape extending in the thickness direction rather than the track width direction in FIG. 20A. Therefore, in the embodiment, as illustrated in FIG. 21, the maximum value of the energy density of the plasmons propagating through the waveguide 32 is increased. In FIG. 21, the horizontal axis indicates a distance (nm) from a center position of the waveguide 32 in the track width direction, and the vertical axis indicates an energy density (absolute value) of the plasmons. In addition, the solid curve corresponds to FIG. 20A, and the dashed curve corresponds to FIG. 20B.

Accordingly, in the embodiment, the edge plasmons 49 with high energy density in the track width direction are obtained as a result. Therefore, when the magnetic information is recorded on the magnetic disc, the write track may be narrowed in width, and the improvement of the recording density may be achieved. Moreover, in the embodiment, the waveguide 32 has a shape in which the dimension in the track width direction is larger than the dimension in the thickness direction. Therefore the energy density in the track width direction of the edge plasmons 49 is advantageously increased.

Moreover, in the embodiment, by providing a refractive index difference between clads surrounding the waveguide 32, the plasmons propagating though the waveguide 32 as illustrated in FIG. 20A has a spot SP with maximum energy density at a position close to the magnetic pole 35 rather than the center position of the waveguide 32. Therefore, when the magnetic information is recorded on the magnetic disk 2, a heating spot on the magnetic disk 2 is close to a generation position of the recording magnetic field, and the heat-assisted magnetic recording with high efficiency and high precision may be achieved.

Furthermore, in the embodiment, the magnetic pole 35 is in contact with the center portion C34 of the plasmon generator 34 at the end portion including the ABS 11S, and in X-axis direction, the magnetic pole 35 has a width smaller than that of the waveguide 32 and of the center portion C34. With such a configuration, the recording magnetic field generated from the magnetic pole 35 may have a steeper distribution. As a result, the maximum intensity of the recording magnetic field necessary for information recording may be further increased.

Although the present invention has been described with the embodiment, the present invention is not limited to the embodiment described above, and various modifications may be made. For example, in the embodiment, although exemplified is a CPP-type GMR element as a read element, the read element is not limited thereto and may be a CIP (current in plane)-GMR element. In this case, an insulating layer needs to be provided between an MR element and a lower shield layer, and between the MR element and an upper shield layer, and a pair of leads for supplying a sense current to the MR element needs to be inserted into the insulating layer. Alternatively, a TMR (tunneling magnetoresistance) element with a tunnel junction film may be used as a read element.

Figure 22:
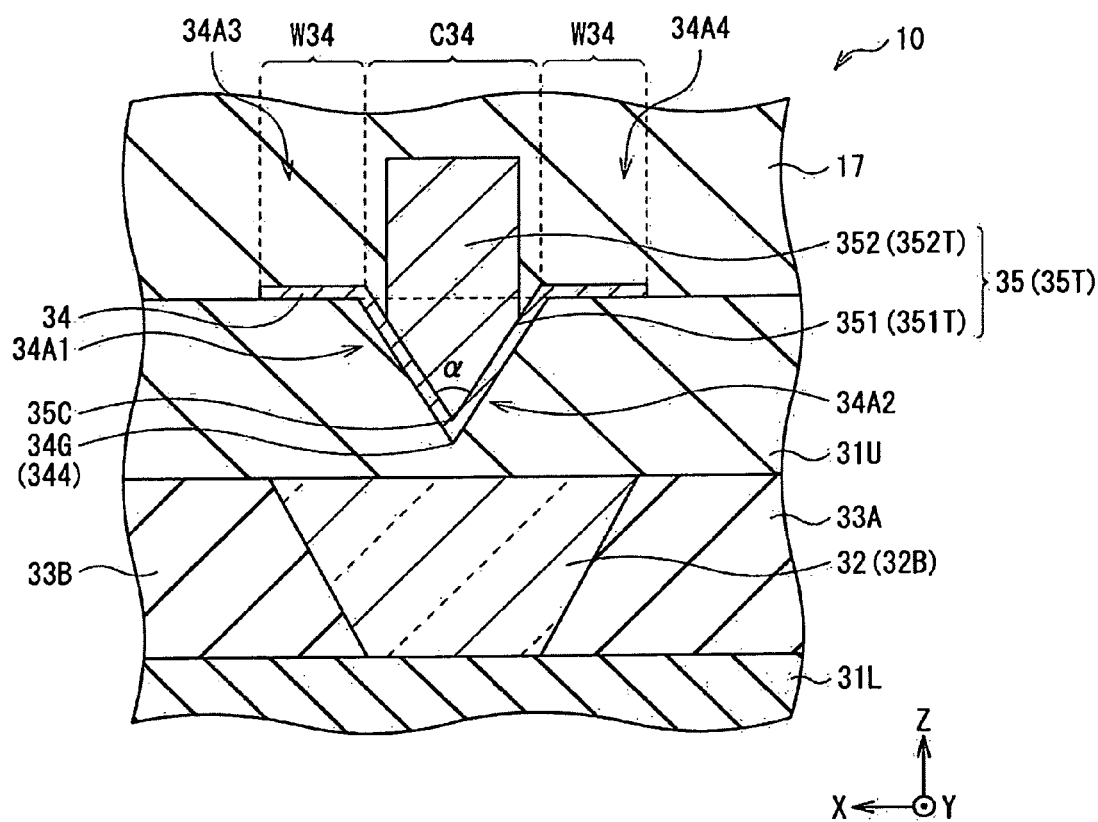
FIG. 22 is a plane view illustrating a configuration of an end surface exposed at an air bearing surface of a magnetic read write head as a first modification of the invention.
Figure 23:
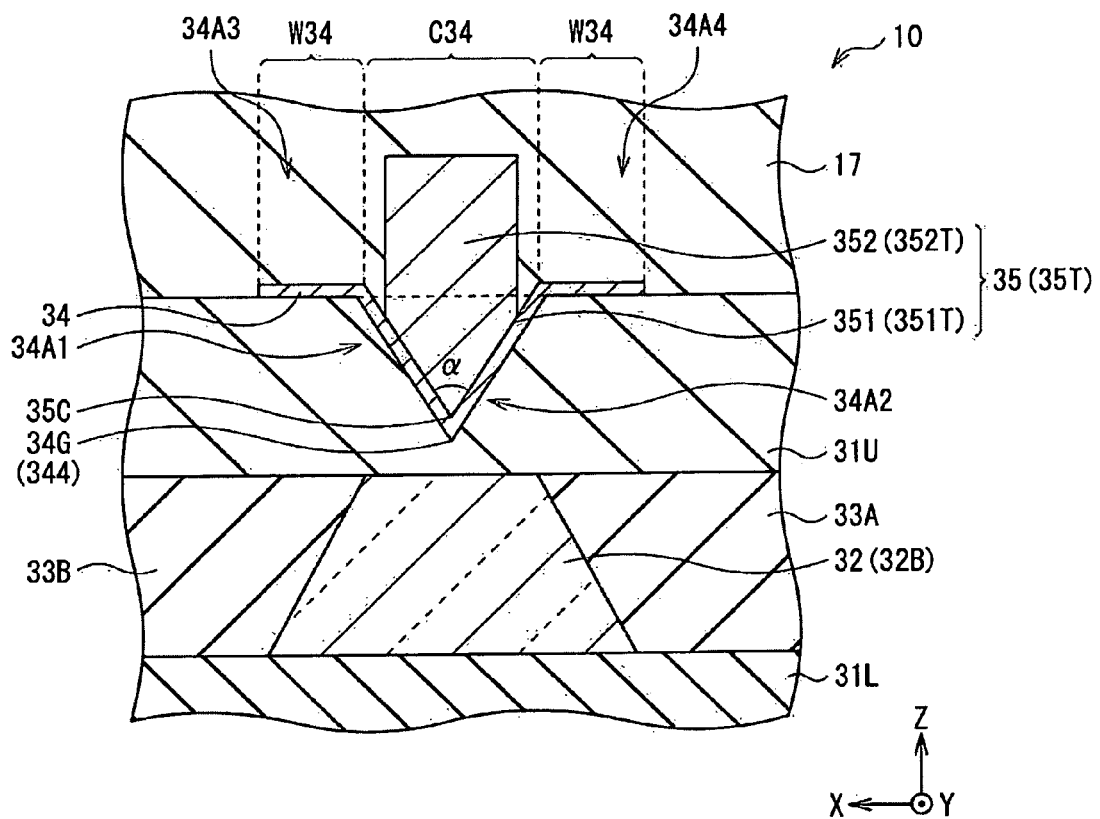
FIG. 23 is a plane view illustrating a configuration of an end surface exposed at an air bearing surface of a magnetic read write head as a second modification of the invention.

In the embodiment as described above, although the cross-sectional surface of the waveguide 32 parallel to the ABS 11S is formed rectangular, the invention is not limited thereto. Specifically, for example, the waveguide 32 illustrated in FIG. 22 or FIG. 23 may be used. FIG. 22 and FIG. 23 illustrate an example of a configuration in the ABS 11S of the heat-assisted magnetic write head included in the invention, and waveguide 32 illustrated in FIG. 22 and FIG. 23 both have a cross-section surface of a trapezoid shape. Particularly, in FIG. 22, the waveguide 32 has a shape in which the evanescent light generating surface 32C is larger than the bottom surface 32D in the track width direction. In contrast, in FIG. 23, the waveguide 32 has a shape in which the bottom surface 32D is larger than the evanescent light generating surface 32C. The waveguide may have a shape other than that illustrated in FIG. 22 or FIG. 23. The cross-sectional shape of the magnetic pole and the plasmon generator is not limited to that described in the embodiment, and may be variously modified. Furthermore, the relative positional relationship and magnitude relationship between the waveguide, the plasmon generator, and the magnetic pole may be appropriately modified.

Figure 24:
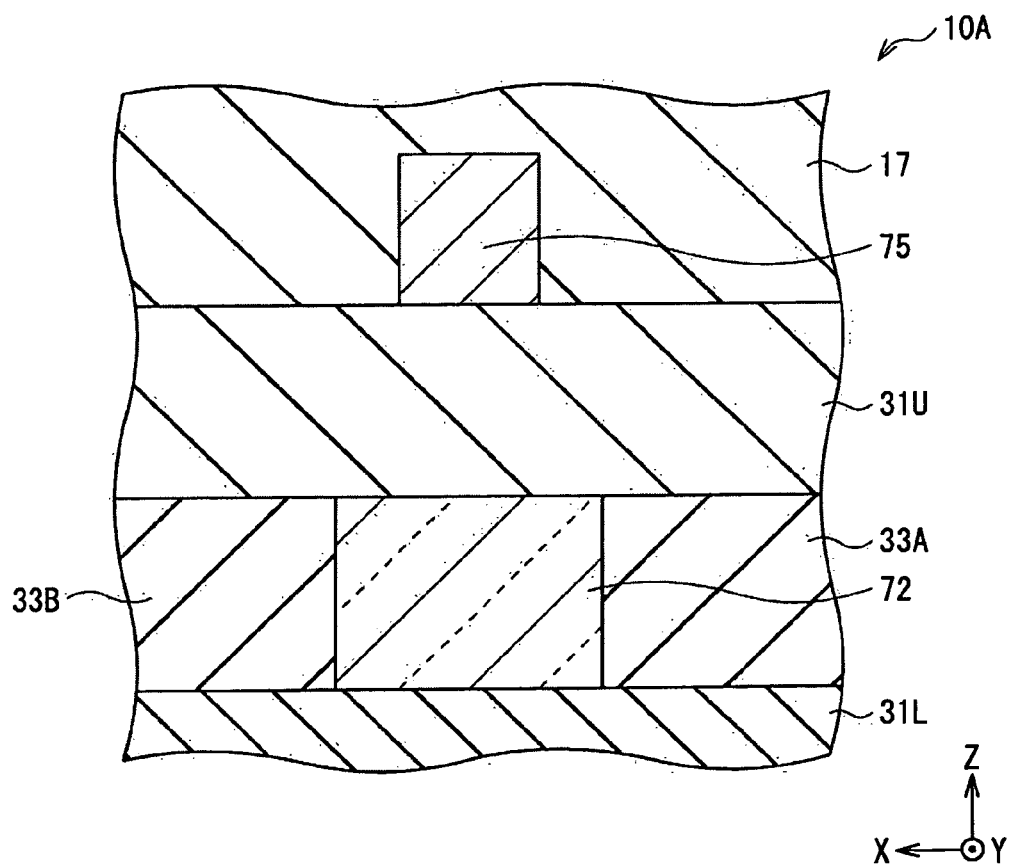
FIG. 24 is a plane view illustrating a configuration of an end surface exposed at an air bearing surface of a magnetic read write head as a third modification of the invention.

Moreover, in the above-described embodiment, the heat-assisted magnetic write head in which the plasmon generator is provided in the vicinity of the waveguide, and the near-field light generated by the plasmon generator, based on light propagating through the waveguide is applied to heat the surface of the magnetic recording medium has been described. However, the present invention is not limited thereto. The present invention includes a heat-assisted magnetic write head including a magnetic read write head 10A in which a magnetic pole 75 and a waveguide 72 are oppositely disposed without using a plasmon generator as illustrated, for example, in FIG. 24. The magnetic read write head 10A applies not near-field light but light emitted from the waveguide 72 to heat the surface of the magnetic recording medium directly. In the magnetic read write head 10A, the waveguide 72 is surrounded by the clads 33A and 33B, which have a refractive index lower than that of the waveguide 72, and the clads 31L and 31U, which have a refractive index lower than that of the clads 33A and 33B to obtain the same effects as those of the above-described embodiment.

The correspondence relationship between the reference numerals and the components of the embodiment is collectively illustrated here. 1 . . . housing, 2 . . . magnetic disk, 3 . . . head arm assembly (HAA), 4 . . . head gimbals assembly (HGA), 4A . . . slider, 4B . . . suspension, 5 . . . arm, 6 . . . drive section, 7 . . . fixed shaft, 8 . . . bearing, 9 . . . spindle motor, 10, 10A . . . magnetic read write heads, 11 . . . substrate, 11A . . . element forming surface, 11S . . . air bearing surface (ABS), 13 . . . insulating layer, 14 . . . read head section, 16 . . . write head section, 17 . . . clad, 21 . . . lower shield layer, 22 . . . MR element, 23 . . . upper shield layer, 24, 25, 27, 38, 39, 42 . . . insulating layers, 28 . . . lower yoke layer, 29 . . . leading shield, 30, 36, 37 . . . connecting layers, 31L, 31U, 33A, 33B . . . clads, 32, 72 . . . waveguides, 34 . . . plasmon generator, C34 . . . center portion, W34 . . . wing portion, 34A to 34C . . . first to third portions, 34G . . . pointed edge, 34L . . . lower layer, 34U . . . upper layer, 341 . . . surface plasmon exciting surface, 344 . . . edge, 35, 75 . . . magnetic poles, 351 . . . first layer, 352 . . . second layer, 40A, 40B . . . connecting portions, 41 . . . coil, 43 . . . upper yoke layer, 45 . . . laser light, 46 . . . evanescent light, 47 . . . surface plasmon, 48, 49 . . . edge plasmons, 50 . . . light source unit, 51 . . . supporting member, 60 . . . laser diode, 61 . . . lower electrode, 62 . . . active layer, 63 . . . upper electrode, 64 . . . reflecting layer, 65 . . . n-type semiconductor layer, 66 . . . p-type semiconductor layer, NF . . . near-field light.

What is claimed is:

1. A heat-assisted magnetic write head comprising:
a magnetic pole having an end surface exposed at an air bearing surface;
a waveguide extending toward the air bearing surface to propagate light; and
a first pair of clads made of a first dielectric material having a refractive index lower than that of the waveguide, and sandwiching the waveguide in a track width direction; and
a second pair of clads made of a second dielectric material having a refractive index lower than that of the first dielectric material, and sandwiching the waveguide in a thickness direction orthogonal to the track width direction.

2. The heat-assisted magnetic write head according to claim 1, wherein the waveguide has a shape in which the maximum dimension in the track width direction is larger than the maximum dimension in the thickness direction.

3. The heat-assisted magnetic write head according to claim 1, wherein light propagating through the waveguide has maximum energy density at a position close to the magnetic pole rather than a center position of the waveguide.

4. The heat-assisted magnetic write head according to claim 1, wherein
the waveguide is formed of a material selected from a group consisting of TiOx (titanium oxide), TaOx (tantalum oxide), and SiNx (silicon nitride),
the first dielectric material is made of SiOx (silicon oxide) or $Al_2O_3$ (aluminum oxide), and
the second dielectric material is made of AlN (aluminum nitride) or $Al_2O_3$ (Aluminum oxide).

5. The heat-assisted magnetic write head according to claim 1, further comprising a plasmon generator provided between the magnetic pole and the waveguide, and generating near-field light from the air bearing surface, based on light propagating through the waveguide.

6. A head gimbals assembly comprising:
a magnetic head slider having a side surface provided with the heat-assisted magnetic write head according to claim 1; and
a suspension having an end portion provided with the magnetic head slider.

7. A head arm assembly comprising:
a magnetic head slider having a side surface provided with the heat-assisted magnetic write head according to claim 1;
a suspension having an end portion provided with the magnetic head slider; and
an arm supporting the other end portion of the suspension.

8. A magnetic disk device including a magnetic recording medium and a head arm assembly, the head arm assembly comprising:
a magnetic head slider having a side surface provided with the heat-assisted magnetic write head according to claim 1;
a suspension having an end portion provided with the magnetic head slider; and
an arm supporting the other end portion of the suspension.

* * * * *